US011503557B2

(12) United States Patent
Aijaz

(10) Patent No.: US 11,503,557 B2
(45) Date of Patent: Nov. 15, 2022

(54) TIME SYNCHRONIZATION IN INTEGRATED 5G WIRELESS AND TIME-SENSITIVE NETWORKING SYSTEMS

(71) Applicant: Kabushiki Kaisha Toshiba, Minato-ku (JP)

(72) Inventor: Adnan Aijaz, Bristol (GB)

(73) Assignee: Kabushiki Kaisha Toshiba, Minato-ku (JP)

( * ) Notice: Subject to any disclaimer, the term of this patent is extended or adjusted under 35 U.S.C. 154(b) by 19 days.

(21) Appl. No.: 16/904,772

(22) Filed: Jun. 18, 2020

(65) Prior Publication Data

US 2021/0400610 A1    Dec. 23, 2021

(51) Int. Cl.
*H04W 56/00* (2009.01)
*H04L 7/00* (2006.01)

(52) U.S. Cl.
CPC ....... *H04W 56/0015* (2013.01); *H04L 7/0012* (2013.01); *H04W 56/005* (2013.01); *H04W 56/007* (2013.01)

(58) Field of Classification Search
CPC ......... H04W 56/0012; H04W 56/0015; H04W 56/005
See application file for complete search history.

(56) References Cited

U.S. PATENT DOCUMENTS

| | | | | |
|---|---|---|---|---|
| 2019/0254057 A1* | 8/2019 | Hampel | ............... | H04W 56/001 |
| 2020/0059829 A1* | 2/2020 | Joseph | ................. | H04W 36/08 |
| 2020/0112975 A1* | 4/2020 | Moon | ................... | H04J 3/0667 |
| 2020/0120536 A1* | 4/2020 | Prakash | ................. | H04L 47/24 |
| 2020/0137615 A1* | 4/2020 | Joseph | ................ | H04L 47/2491 |
| 2020/0228220 A1* | 7/2020 | Joseph | ................... | H04J 3/0644 |
| 2020/0259896 A1* | 8/2020 | Sachs | ................. | G07C 9/00174 |
| 2020/0267673 A1* | 8/2020 | Joseph | ................ | H04W 56/001 |
| 2020/0267785 A1* | 8/2020 | Talebi Fard | ........ | H04W 40/246 |
| 2020/0329441 A1* | 10/2020 | Ha | ...................... | H04W 56/001 |
| 2020/0351752 A1* | 11/2020 | Sivasiva Ganesan | .. | H04L 41/12 |
| 2021/0006344 A1* | 1/2021 | Chen | ....................... | G01S 19/39 |
| 2021/0007160 A1* | 1/2021 | Sivasiva Ganesan | ...................... | H04W 48/16 |
| 2021/0144666 A1* | 5/2021 | Sivasiva Ganesan | ...................... | H04J 3/0658 |

FOREIGN PATENT DOCUMENTS

| | | | |
|---|---|---|---|
| WO | WO 2019/166081 A1 | | 9/2019 |
| WO | WO 2020/021309 A1 | | 1/2020 |
| WO | WO2020104953 A1 | * | 5/2020 |

OTHER PUBLICATIONS

Mahmood et al.; "Time Synchronization in 5G Wireless Edge: Requirements and Solutions for Critical-MTC"; Jun. 14, 2019 (Year: 2019).*

(Continued)

*Primary Examiner* — Gary Mui
(74) *Attorney, Agent, or Firm* — Oblon, McClelland, Maier & Neustadt, L.L.P.

(57) ABSTRACT

In a hybrid network comprising both guided and wireless communications technologies, a grandmaster clock is designated in one portion of the network and can be propagated across to the other portion by means of a timing synchronization message. This message may include timestamping information and other information to enable recipient devices to correctly synchronize to the grandmaster clock.

19 Claims, 24 Drawing Sheets

(56) References Cited

OTHER PUBLICATIONS

Ericsson; "Clarification of 5G clock in relation to TSN time synchronization"; 3GPP TSG-SA WG2 Meeting #129BIS West Palm Beach, Florida, Nov. 26-30, 2018; S2-1812417 (Year: 2018).*
Huawei, HiSilicon; "Solution of Time Synchronization in Multiple TSN Clock Domains"; SA WG2 Meeting #129bis Nov. 26-30, 2018, West Palm Beach, Florida, US; S2-1812413 (Year: 2018).*
Aijaz, A. et al., "The Tactile Internet for Industries: A Review," Proceedings of the IEEE, vol. 107, No. 2, Feb. 2019, 22 pages.
Aijaz, A., "Packet Duplication in Dual Connectivity Enabled 5G Wireless Networks: Overview and Challenges," IEEE Communications Standards Magazine, vol. 3, No. 3, Sep. 2019, 9 pages.

* cited by examiner

TIME SYNCHRONIZATION IN INTEGRATED 5G WIRELESS AND TIME-SENSITIVE NETWORKING SYSTEMS

FIELD

The present disclosure concerns time synchronization in communications systems.

DESCRIPTION OF EMBODIMENTS

Figure 1:
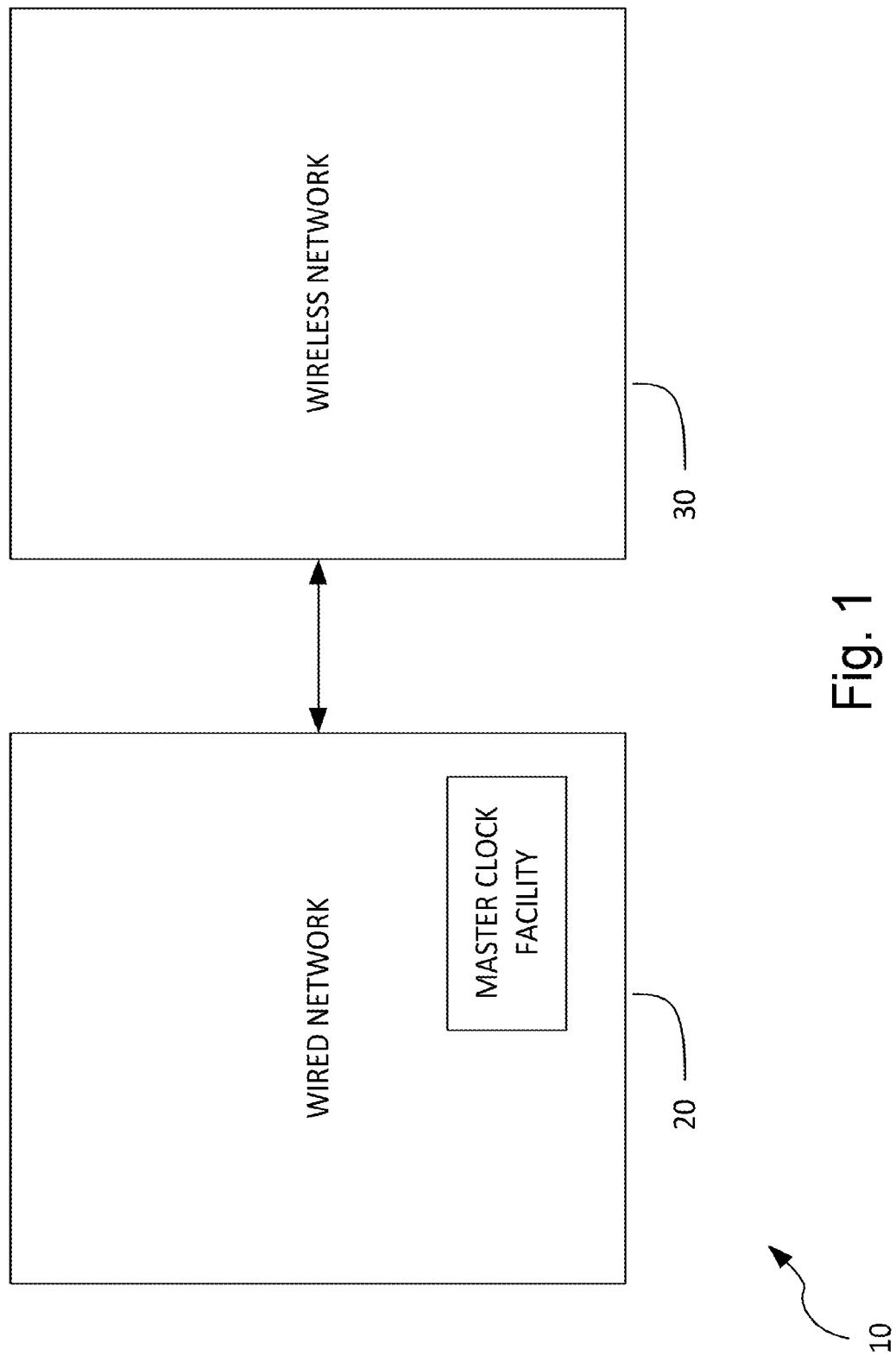
FIG. 1 illustrates schematically a network arrangement of a wireless network and a guided communication network, in accordance with embodiments of the present disclosure.

In general terms, an aspect of the present disclosure concerns a hybrid network comprising both guided and wireless communications technologies. A grandmaster clock is designated in one portion of the network and can be propagated across to the other portion by means of a timing synchronization message. This message may include time-stamping information and other information to enable recipient devices to correctly synchronize to the grandmaster clock.

Recent trends in communication engineering have included a transition toward industrial networking, i.e. the establishment of communication between entities in an industrial setting. There is an increased desire to provide digital communication to and from industrial equipment, such as processing or manufacturing equipment, to enable control of such equipment or gathering diagnostics data from such equipment.

In general, guided connections, such as wired communication, involving electrically conducting connectors between devices, has been widely employed. Other guided connections are available, such as powerline communications or fibre optic connections. In this disclosure, the term "guided connection" is used to denote any non-wireless communication medium, and the disclosure is not limited to wired electrical connections provided for the specific purpose of communication.

Industrial Ethernet is currently the most widespread technology for real-time communication in industrial networks. Strictly, the term "Ethernet" is reserved to denote any technology compliant with the IEEE802.3 family of standards. However, the term "Ethernet" can be used more generically to refer to other technologies which could, in other implementations, be used to establish real-time communication between devices on a guided medium.

In the following disclosure, discussion is focused on Ethernet based implementations, but this does not exclude the possible applicability of this disclosure to other guided medium communications not strictly within the scope of the IEEE802.3 standards.

Many different implementations of industrial Ethernet exist, some of which are incompatible with each other. Time-sensitive networking (TSN) is a set of standards under development within the IEEE 802.1 working group to improve the real-time capabilities of standard Ethernet. TSN is expected to be the de-facto wired technology for industrial communication. TSN provides guaranteed data delivery with deterministic and bounded latency and extremely low data loss. TSN supports both time-critical and best-effort traffic over a single standard Ethernet network. TSN includes various standards which can be grouped into time synchronization, ultra-high reliability, bounded low latency, and resource management.

Driven by increasing demand for connectivity between industrial devices and equipment, as grouped together under the heading "Industry 4.0", various new industrial control applications are emerging that are characterized by the requirements of mobility and flexibility. That is, the need to digitize interactions between industrial devices now extends beyond static or near static machinery. For such control applications, wired technologies like TSN may present challenges.

Thus, wireless technologies such as 5G New Radio (NR) may offer benefits in industrial control and automation. 5G NR has been designed with native support for ultra-reliable low latency communication (uRLLC). In addition to 5G, recent proprietary low-power industrial wireless technologies are expected to fulfil the stringent requirements of industrial control applications.

Wireless technologies offer flexibility by virtue of their lack of reliance on a guided physical communication medium. All that is required is a pathway for electromagnetic transmission of the signal from a transmitter to a receiver. This pathway is unguided, in the sense that it can take any path between those two points, and is not bound to a particular channel or line of propagation. So, for contrast with guided media, such communication media can be referred to as "unguided media".

It is of course noted that the 5G family of technology provides a facility for beamforming either or both at the transmitter and the receiver. This does not diminish the concept of "unguided media"—the components have freedom to establish any propagation pathway within the medium.

It is desirable to explore ways of integrating TSN and high-performance wireless technologies such as 5G and GALLOP. Such integration may, in certain embodiments, provide end-to-end deterministic connectivity, which could lead to various design simplifications in industrial automation networks. However, such integration and converged operation of TSN and high-performance wireless also creates various challenges.

One of the main challenges for integrated/converged operation of wired systems such as TSN and wireless systems such as 5G is accurate inter-system time synchronization. Time synchronization in TSN is based on the IEEE 802.1AS standard. However, this time synchronization cannot be directly extended to integrated TSN and 5G systems.

An embodiment disclosed herein provides a time synchronization framework for converged operation of wired systems such as TSN and wireless systems such as 5G. Aspects of the present disclosure provide time synchronization between wired systems such as TSN and wireless systems such as 5G systems in a range of operational scenarios.

These embodiments may provide native support for multiple clock models, bi-directional over-the-air time synchronization, correction for a range of air-interface timing errors, and precision time protocol (PTP)-like functionality at the air-interface (radio interface).

Embodiments disclosed herein concern time synchronization in time sensitive networks. In particular examples, embodiments are disclosed for achieving accurate time synchronization in integrated/converged operation of wired networks and wireless networks. Examples of wired networks can include IEEE 802.1 Time-sensitive networking (TSN); examples of wireless networks can include 5G wireless systems.

Time-sensitive networking (TSN) is a set of standards under development within the IEEE 802.1 working group to improve the real-time capabilities of standard Ethernet. It is expected that TSN will be adopted as a standard technology for industrial communication over wired connections.

However, many new industrial control applications are emerging for which wired technologies are not feasible or desirable. For instance, for control of moving machinery, or machinery for use in restricted or hazardous environments, it may be desirable to enable wireless communication. High-performance wireless technologies such as 5G New Radio (NR) are potential candidates for supporting such wireless communication.

Certain implementations may provoke integrated or converged operation of TSN and 5G systems. This may lead to design simplifications in industrial systems. Such integration also offers the opportunity for new industrial applications. However, converged operation of TSN and 5G systems also creates several challenges. One such challenge is time synchronization between a wired (e.g. TSN) system and a wireless (e.g. 5G) system.

For example, time synchronization in TSN is based on the IEEE 801.AS standard. However, it cannot be directly extended to integrated TSN and 5G scenarios.

Embodiments disclosed herein seek to achieving accurate time synchronization between wireless (e.g. 5G) and wired (e.g. TSN) systems. Embodiments disclosed herein time synchronization between such systems in a wide range of operation scenarios. Embodiments disclosed herein include native support for multiple clock models, bi-directional over-the-air time synchronization, correction for air-interface timing errors and precision time protocol (PTP)-like functionality at the air-interface.

An aspect of an embodiment disclosed herein provides a method for transporting time synchronization information in a hybrid wired networking system implemented for transport of time-sensitive data, and a wireless system, such that the wired system comprises a wired system grandmaster clock and one or more wired system end stations or wired system bridges, and the wireless system comprises a wireless system grandmaster clock, a radio access network (RAN) consisting of a base station and one or more wirelessly connected devices and a core network entity known as user-plane function (UPF).

In the context of 5G implementations, the base station may be implemented by a gNB of 5G, the wirelessly connected devices may be implemented by user equipment (UE) and the core network entity may be implemented by a user plane function (UPF). However, use of such terms in this disclosure should not be considered as limitation of this disclosure to 5G implementations.

In an embodiment, the base station in the RAN has direct access to the wired system grandmaster clock through either direct connectivity or through a time-synchronized transport network connecting the base station and the core network entity, and time synchronization information pertaining to the wired system grandmaster clock is transported through air-interface signaling procedures implemented in the wireless system.

In an embodiment, the base station time synchronizes a wirelessly connected device to the wired system grandmaster clock by sending one or multiple wireless communication timestamp messages containing at least the original timestamp (or equivalent grandmaster time) of the wired system grandmaster time, a reference time in the wireless system and a specific parameter accounting for air-interface timing errors between the base station and the wirelessly connected device.

The reference time in the wireless system may be determined based on reception of a time synchronization message from the core network entity and a specific timing instant in the wireless system, which may be indicated by a combination of a reference frame, a reference slot and clock units of the wireless system clock.

The wireless system may transmit a wireless communication rate correction factor message after transmission of the timestamp message such that the wireless communication rate correction factor message contains a rate correction factor parameter to assist the recipient wirelessly connected device in determining a clock frequency offset with respect to the base station clock.

Each wirelessly connected device may account for propagation delay between itself and the base station based on a timing advance parameter known to the wirelessly connected device.

Each wirelessly connected device may comprise a clock. Each wirelessly connected device may synchronize its clock with a wired system end station and/or a wired system bridge by sending a time synchronization message that contains an original timestamp previously received from the wired system grandmaster clock, and a wireless communication rate correction factor message comprising a correction factor to account for the time spent in the RAN and a rate ratio parameter which is determined based on the rate correction factor (signalled by the rate correction factor parameter) and reception times of the two wireless communication messages received from the base station.

The time synchronization message and the wireless communication rate correction factor message may be system information broadcast messages, multicast messages or unicast messages. In the case that they comprise unicast or multicast messages, they may be transported over a physical downlink shared channel defined of the wireless communication system.

The time synchronization message and the wireless communication rate correction factor message may be repeated to account for clock drift errors.

In an embodiment, the wired system is in communication with a wirelessly connected device of the wireless system. The wirelessly connected device may comprise a clock, maintaining a time at the wirelessly connected device. The time maintained at the wirelessly connected device may be synchronized with the wired system grandmaster clock. In this case, the time maintained at the wirelessly connected device may be synchronized with the time at the base station based on air-interface signaling messages.

Time synchronization between the wirelessly connected device and the wireless base station may be achieved through transmission of a first synchronization message containing the original timestamp of the wired system grandmaster clock, a reference time in the wireless system and a wireless system error parameter.

The base station may be responsive to receipt of the first synchronization message to transmit a second synchronization message. The second synchronization message may provide resource allocation to the wirelessly connected device to enable the wirelessly connected device to transmit a third synchronization message which may contain a rate correction factor parameter. The rate correction factor parameter may assist the base station in determining the clock frequency offset with respect to the clock of the wirelessly connected device.

The base station time can synchronize with a wired system end station or a wired system bridge by transmitting a time synchronization message that contains the original time stamp of the wired system grandmaster clock, a correction parameter that accounts for the time spent in the 5G RAN and a rate ratio parameter which is determined based on the rate correction factor received from the UE and the reception times of the above first and second synchronization messages of the wireless system.

The three wireless system synchronization messages may be MAC layer (Layer 2) messages or RRC layer (Layer 3) messages.

In an embodiment, the wireless system clock is the wired system grandmaster clock and the time held at the wirelessly connected devices and the core network entity synchronize associated wired system end stations or wired system bridges based on the wireless system clock.

In a case wherein the wireless system clock is used as the reference clock, such that time synchronization between the base station and the wirelessly connected device is achieved based on time stamping a time synchronization message received from a wired system based on the wireless system clock, the difference between the wired grandmaster time and the wireless system time and the residence time spent in the wireless RAN.

An aspect of the present disclosure provides a method of time synchronizing a base station and a wirelessly connected device in a RAN based on exchange of timestamps such that the timestamps are carried in wireless system messages and timestamped at two different protocol stack layers: once at the PDCP layer (upper layer 2) and once at the MAC layer (lower layer 2).

According to this aspect, the time at the wirelessly connected device may synchronize to the base station by determining a clock offset based on timestamps at two different layers.

The wirelessly connected device may account for delay asymmetry between the wirelessly connected device and the base station based on timestamps of the PDCP layer or the MAC layer.

The base station may have access to the grandmaster time of the wired system based on synchronization messages received from the core network entity; the base station time may synchronize the wirelessly connected device based on exchange of timestamping information.

The base station may indicate an equivalent wired system grandmaster time as the time for transmission of a PDCP layer synchronization message to the wirelessly connected device.

The wirelessly connected device time may synchronize a wired system end station or a wired system bridge by transmitting a time synchronization message that contains the wired system grandmaster time, a correction parameter that accounts for the time spent in the wireless system RAN and a rate ratio parameter that is determined based on reception times of PDCP layer synchronization messages.

Embodiments can provide accurate time synchronization between TSN and 5G systems in a wide range of operational scenarios. Certain embodiments exhibit particular features, such as:

Bi-directional Time Synchronization—Some embodiments provide bi-directional over-the-air time synchronization using 5G internal signaling and procedures. This implies that TSN grandmaster clock is not restricted to be on a specific side of the 5G network.

Air-interface Timing Errors—Some embodiments capture different types of timing errors that arise on the air-interface. Such errors include frequency offset errors, reference time indication errors, and clock drift errors.

PTP-like Functionality on the Air-interface—Some embodiments provide time synchronization over the air-interface through a PTP like functionality. This is achieved through multi-layer timestamping and resource allocation for timing messages. It also accounts for delay asymmetry between a master clock and a slave clock.

Multiple Clock Models—Native support is provided in some embodiments for multiple clock models for TSN and 5G integration. Some of these clock models are particularly important for private 5G deployments. In some embodiments, it provides a boundary clock functionality. In some embodiments, a transparent clock functionality is provided without requiring a fixed residence time in the 5G system or explicit signaling of ingress/egress timestamps. In some embodiments, a single time domain is considered, integrating multiple TSN domains, using the 5G clock as grandmaster.

FIG. 1 shows, in general schematic form, a network arrangement 10 comprising a wired network 20 and a wireless network 30. The wired network 20 hosts a master clock facility which is served to devices on the wireless network 30. Synchronization of local clocks of devices of the wireless network 30 with the clock facility of the wired network 20 is achieved using embodiments of the present disclosure, as will be described.

As will become apparent from further disclosure, the master clock facility can be hosted in the wireless network in other embodiments.

Figure 2:
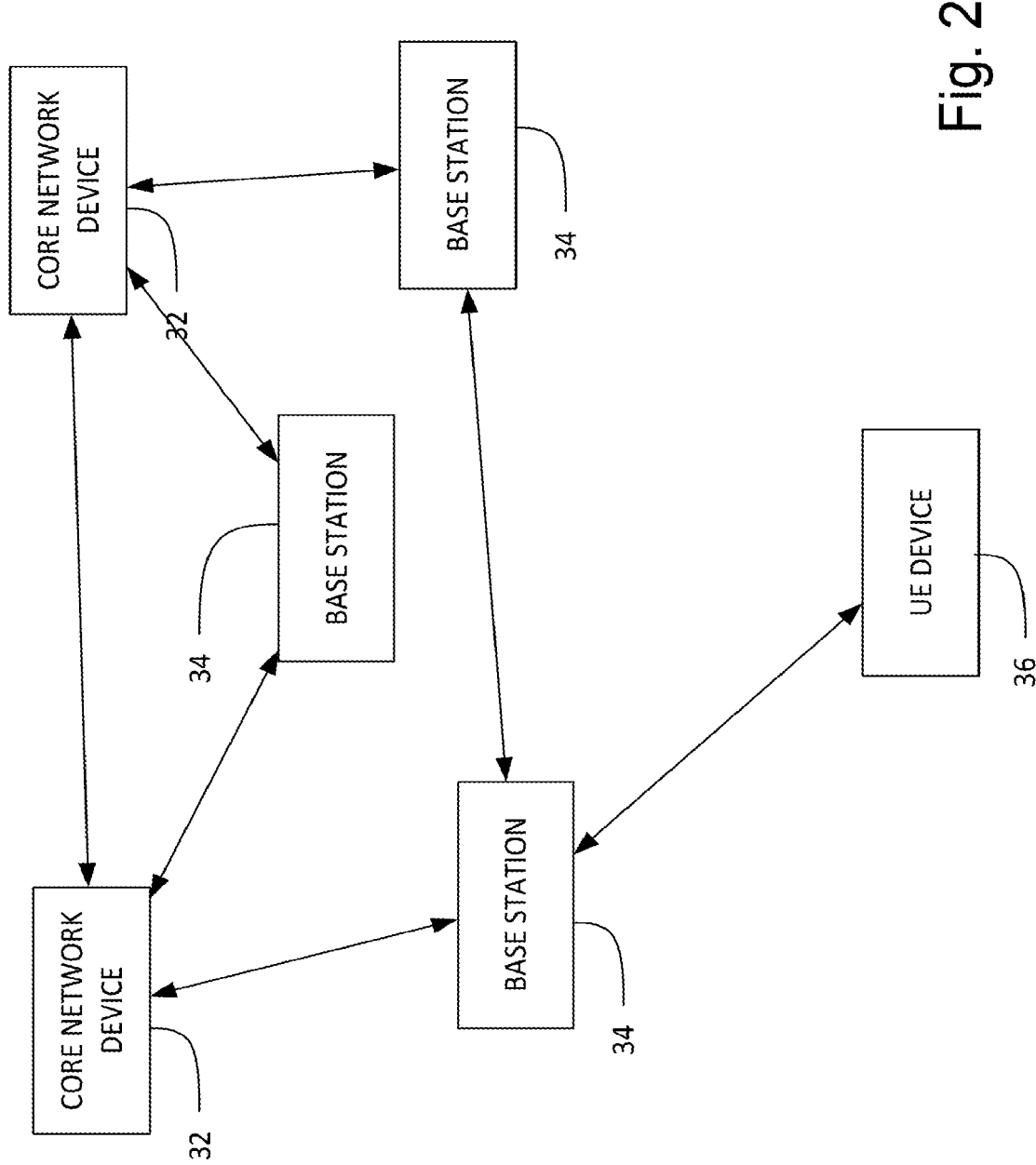
FIG. 2 illustrates the architecture of the wireless network of FIG. 1.

FIG. 2 illustrates the architecture of the wireless network 30 of FIG. 1, implemented as a 5G New Radio (NR) network in which present embodiments are effected. The wireless network comprises a plurality of core network components 32, connected with a plurality of base stations 34. The base stations can establish wireless communication with one or more User Equipment (UE) devices 36.

Figure 3:
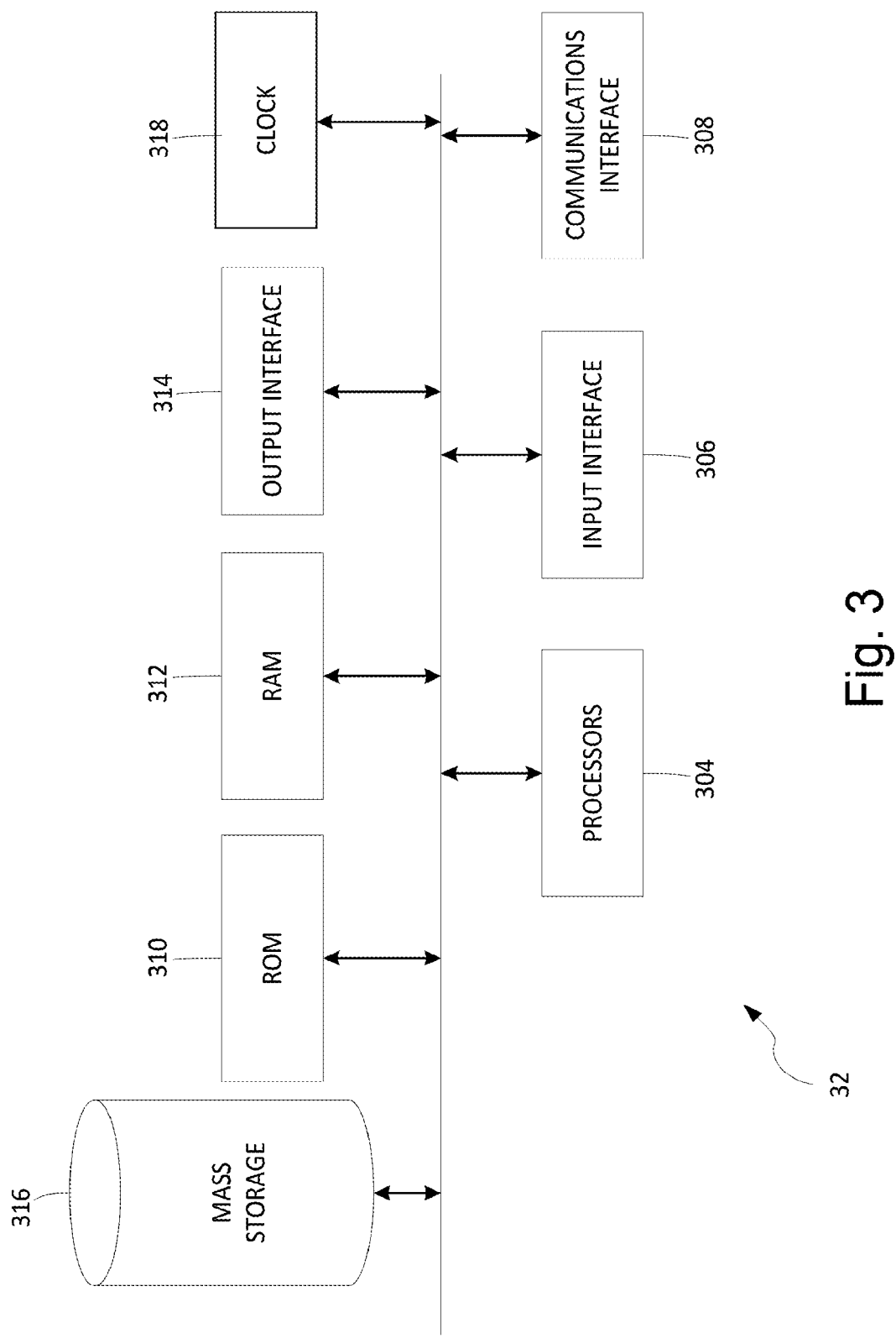
FIG. 3 illustrates the architecture of a core network component of the wireless network of FIG. 2.

FIG. 3 illustrates the architecture of a core network component 32. As shown in FIG. 3, the core network component 32 is a computer apparatus, in structure and function.

It may share certain features with general purpose computer apparatus, but some features may be implementation specific, given the specialised function for which the network component 32 is to be put. The reader will understand which features can be of general-purpose type, and which may be required to be configured specifically for use in the current context.

The apparatus 32 thus comprises one or more processors 304, either generally provisioned, or configured for other purposes such as mathematical operations, audio processing, managing a communications channel, and so on.

An input interface 306 provides a facility for receipt of user input actions. Such user input actions could, for instance, be caused by user interaction with a specific input unit including one or more control buttons and/or switches, a touchscreen, a keyboard, a mouse or other pointing device, a speech recognition unit enabled to receive and process speech into control commands, a signal processor configured to receive and control processes from another device such as a tablet or smartphone, or a remote-control receiver. This list will be appreciated to be non-exhaustive and other forms of input, whether user initiated or automated, could be envisaged by the reader.

Likewise, an output interface 314 is operable to provide a facility for output of signals to a user or another device. Such output could include a display signal for driving a local video display unit (VDU) or any other device.

A communications interface 308 implements a communications channel, whether broadcast or end-to-end, with one or more recipients of signals. In the context of the present embodiment, the communications interface is configured to cause emission of signals for communication with base stations 34 or other core network components 32.

The processors 304 are operable to execute computer programs, in operation of the component 32. In doing this, recourse is made to data storage facilities provided by a mass storage device 308 which is implemented to provide large-scale data storage albeit on a relatively slow access basis, and will store, in practice, computer programs and, in the current context, communication data, in preparation for execution of an encoding process prior to the placement of encoded data on a transmitted signal.

A Read Only Memory (ROM) 310 is preconfigured with executable programs designed to provide the core of the functionality of the component 32, and a Random Access Memory 312 is provided for rapid access and storage of data and program instructions in the pursuit of execution of a computer program. Each of these is configured to implement a communications protocol adopted by plural interoperable devices.

A clock 318 provides a timing signal for all other components of the device. The clock signal can be adjusted if required, for synchronization with other devices.

Figure 4:
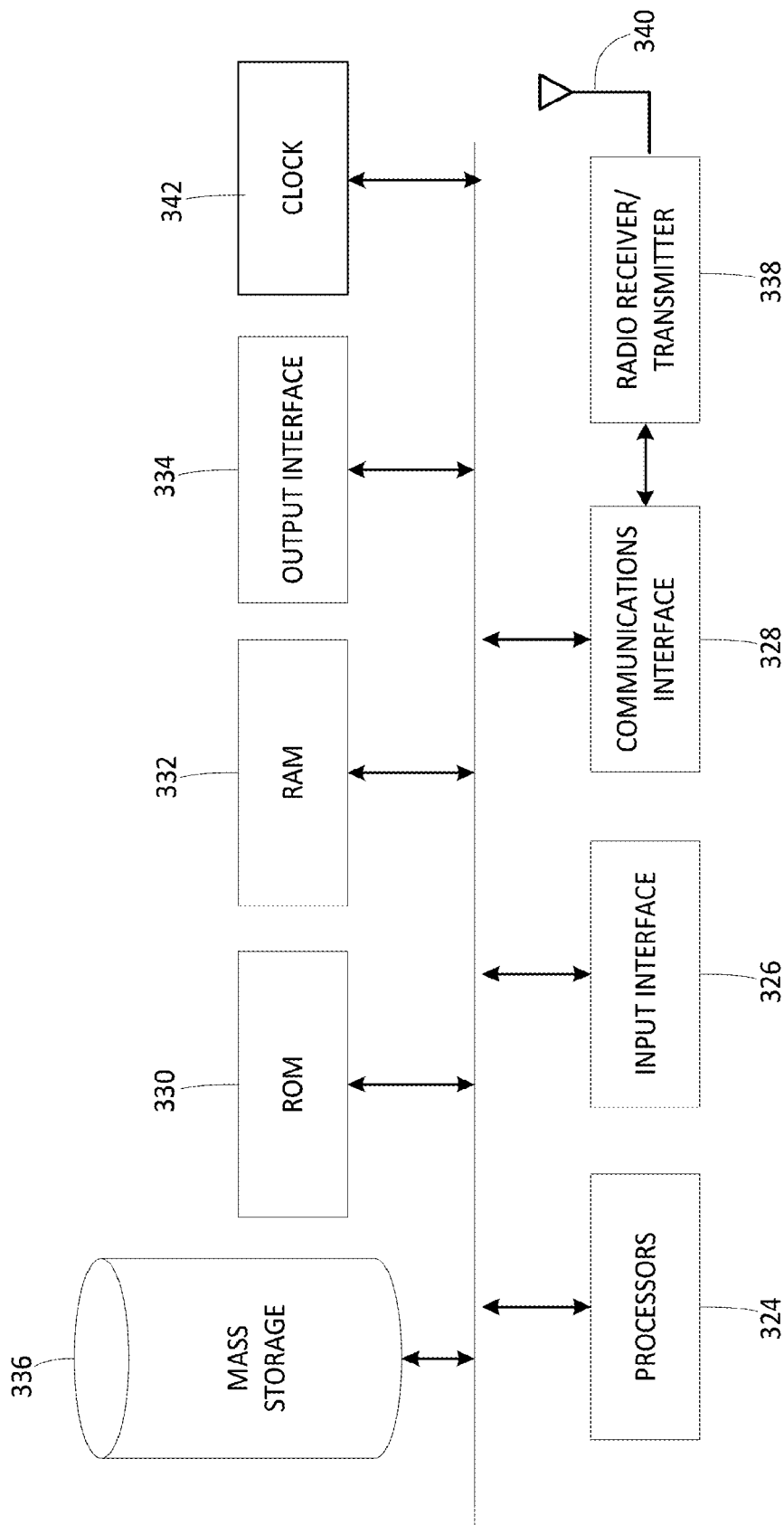
FIG. 4 illustrates the architecture of a base station of the wireless network of FIG. 2.

FIG. 4 illustrates the architecture of a base station 34. As shown in FIG. 4, the base station is a computer apparatus, in structure and function. It may share certain features with general purpose computer apparatus, but some features may be implementation specific, given the specialised function for which the base station is to be put. The reader will understand which features can be of general-purpose type, and which may be required to be configured specifically for use in a wireless communications transmitter.

The base station 34 thus comprises one or more processors 324, either generally provisioned, or configured for other purposes such as mathematical operations, audio processing, managing a communications channel, and so on.

An input interface 326 provides a facility for receipt of user input actions. Such user input actions could, for instance, be caused by user interaction with a specific input unit including one or more control buttons and/or switches, a touchscreen, a keyboard, a mouse or other pointing device, a speech recognition unit enabled to receive and process speech into control commands, a signal processor configured to receive and control processes from another device such as a tablet or smartphone, or a remote-control receiver. This list will be appreciated to be non-exhaustive and other forms of input, whether user initiated or automated, could be envisaged by the reader. It will be appreciated that such user input actions would not normally be required in general operation, but may be required in installation or maintenance of the equipment.

Likewise, an output interface 334 is operable to provide a facility for output of signals to a user or another device. Such output could include a display signal for driving a local video display unit (VDU) or any other device.

A communications interface 328 implements a communications channel, whether broadcast or end-to-end, with one or more recipients of signals. In the context of the present embodiment, the communications interface is configured to cause emission of a signal encoded by the base station. The communications controller 328 is in communication with a receive/transmit unit 338 which is operable to translate signals between the domain used by the controller and the radio signal domain used for wireless communication, the radio signal domain signals being transmitted and received at an antenna 340.

The processors 324 are operable to execute computer programs, in operation of the base station 34. In doing this, recourse is made to data storage facilities provided by a mass storage device 328 which is implemented to provide large-scale data storage albeit on a relatively slow access basis, and will store, in practice, computer programs and, in the current context, communication data, in preparation for execution of an encoding process prior to the placement of encoded data on a transmitted signal.

A Read Only Memory (ROM) 330 is preconfigured with executable programs designed to provide the core of the functionality of the base station 34, and a Random Access Memory 332 is provided for rapid access and storage of data and program instructions in the pursuit of execution of a computer program. Each of these is configured to implement a communications protocol adopted by plural interoperable devices.

A clock 342 provides a timing signal for all other components of the device. The clock signal can be adjusted if required, for synchronization with other devices.

Figure 5:
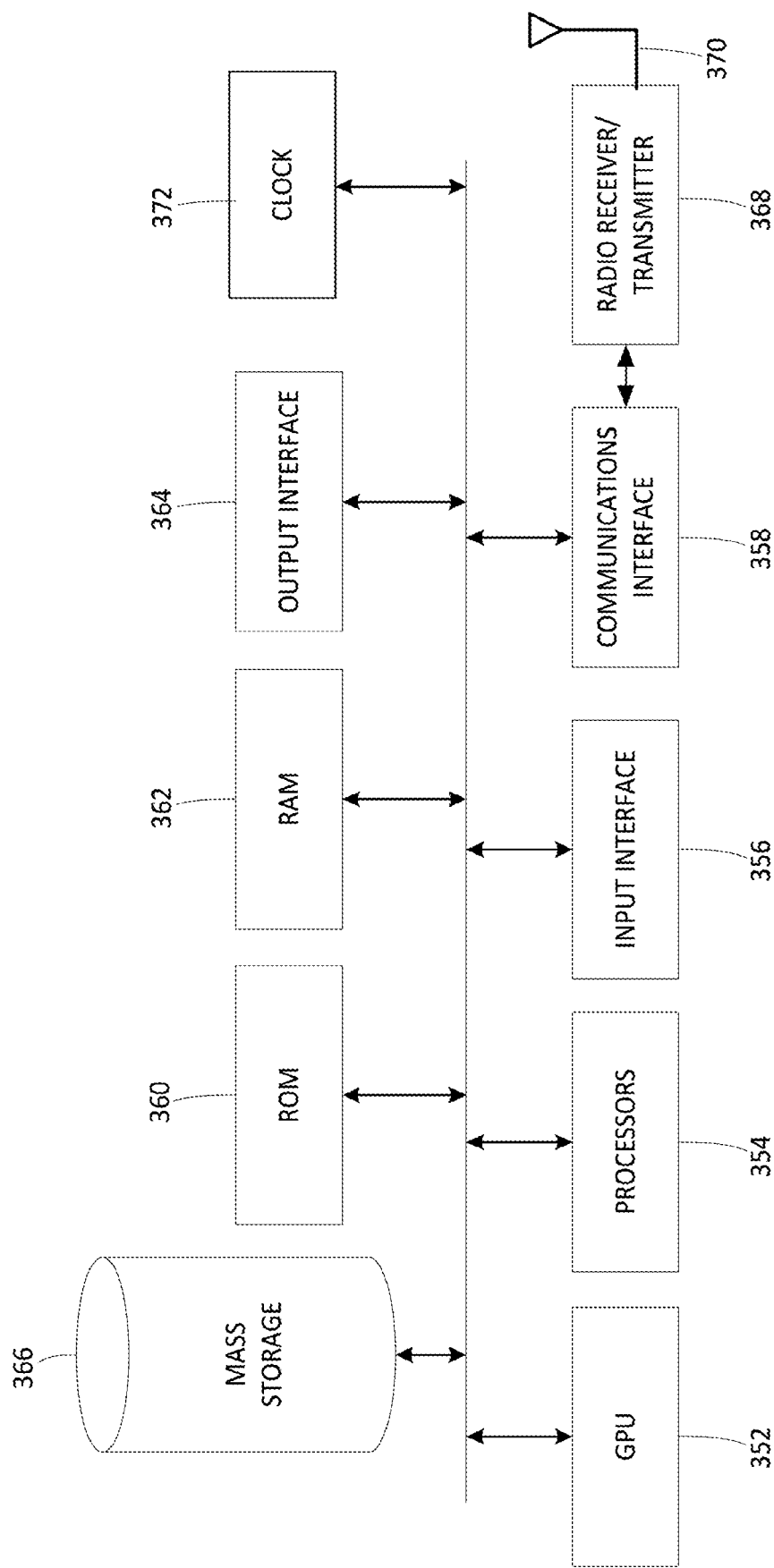
FIG. 5 illustrates the architecture of a user equipment device of the wireless network of FIG. 2.

FIG. 5 illustrates the architecture of a UE 36. As shown in FIG. 5, the UE 36 is a computer apparatus, in structure and function. It may share certain features with general purpose computer apparatus, but some features may be implementation specific, given the specialised function for which the UE 36 is to be put. The reader will understand which features can be of general-purpose type, and which may be required to be configured specifically for use in a user device.

The UE 36 thus comprises a parallel processor 352 configured for specific use in processing large data sets, suitable for use in digital communication. The UE 36 also comprises one or more other processors 354, either generally provisioned, or configured for other purposes such as mathematical operations, audio processing, managing a communications channel, and so on.

An input interface 356 provides a facility for receipt of user input actions. Such user input actions could, for instance, be caused by user interaction with a specific input unit including one or more control buttons and/or switches, a touchscreen, a keyboard, a mouse or other pointing device, a speech recognition unit enabled to receive and process speech into control commands, a signal processor configured to receive and control processes from another device such as a tablet or smartphone, or a remote-control receiver. This list will be appreciated to be non-exhaustive and other forms of input, whether user initiated or automated, could be envisaged by the reader.

Likewise, an output interface 364 is operable to provide a facility for output of signals to a user or another device. Such output could include a display signal for driving a local video display unit (VDU) or any other device.

A communications interface 358 implements a communications channel, whether broadcast or end-to-end, with one or more recipients of signals. In the context of the present embodiment, the communications interface is configured to cause emission and reception of signals via a receive/transmit interface 368 and a radio antenna 370.

The processors 352, 354 are operable to execute computer programs, in operation of the UE 36. In doing this, recourse is made to data storage facilities provided by a mass storage device 366 which is implemented to provide large-scale data storage albeit on a relatively slow access basis, and will store, in practice, computer programs and, in the current context, communication data, in preparation for execution of an encoding process prior to the placement of encoded data on a transmitted signal.

A Read Only Memory (ROM) 360 is preconfigured with executable programs designed to provide the core of the functionality of the UE 36, and a Random Access Memory 362 is provided for rapid access and storage of data and program instructions in the pursuit of execution of a computer program. Each of these is configured to implement a communications protocol adopted by plural interoperable devices.

A clock 372 provides a timing signal for all other components of the device. The clock signal can be adjusted if required, for synchronization with other devices.

Figure 6:
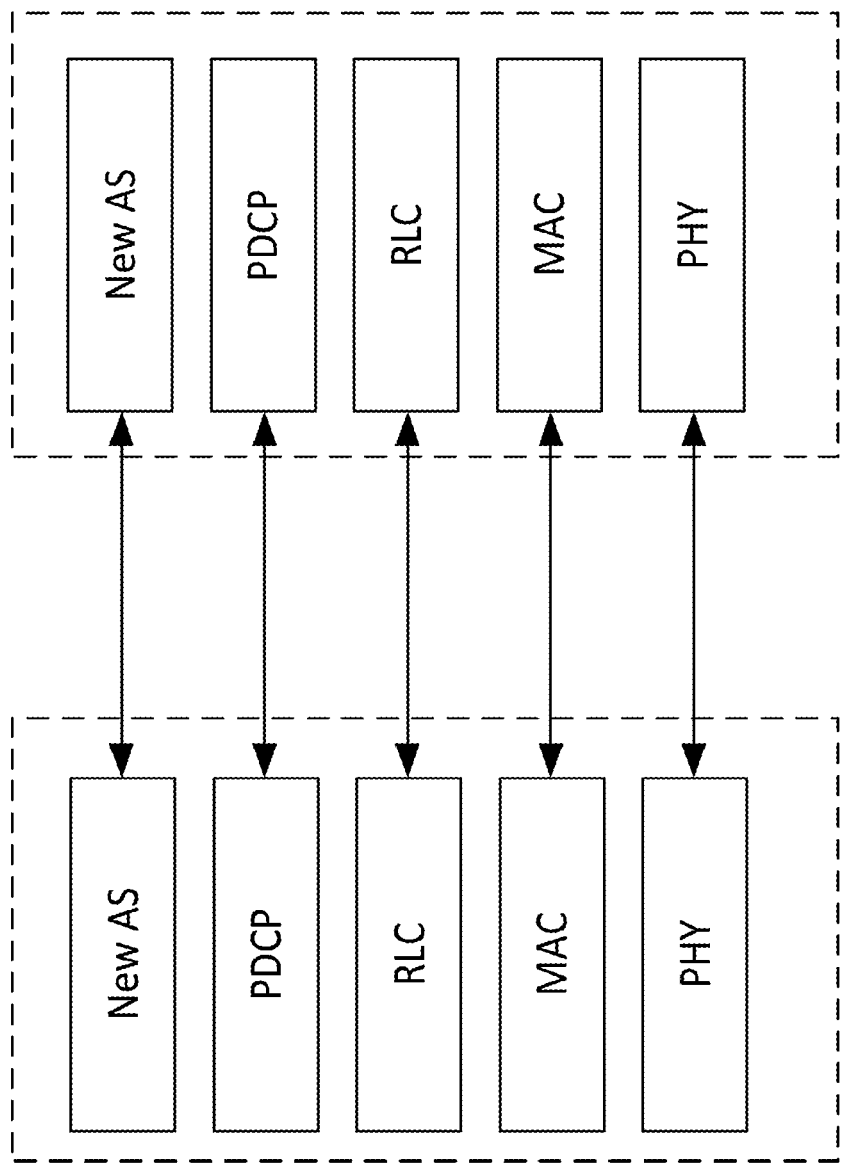
FIG. 6 illustrates a user plane protocol stack of the wireless network of FIG. 2.
Figure 7:
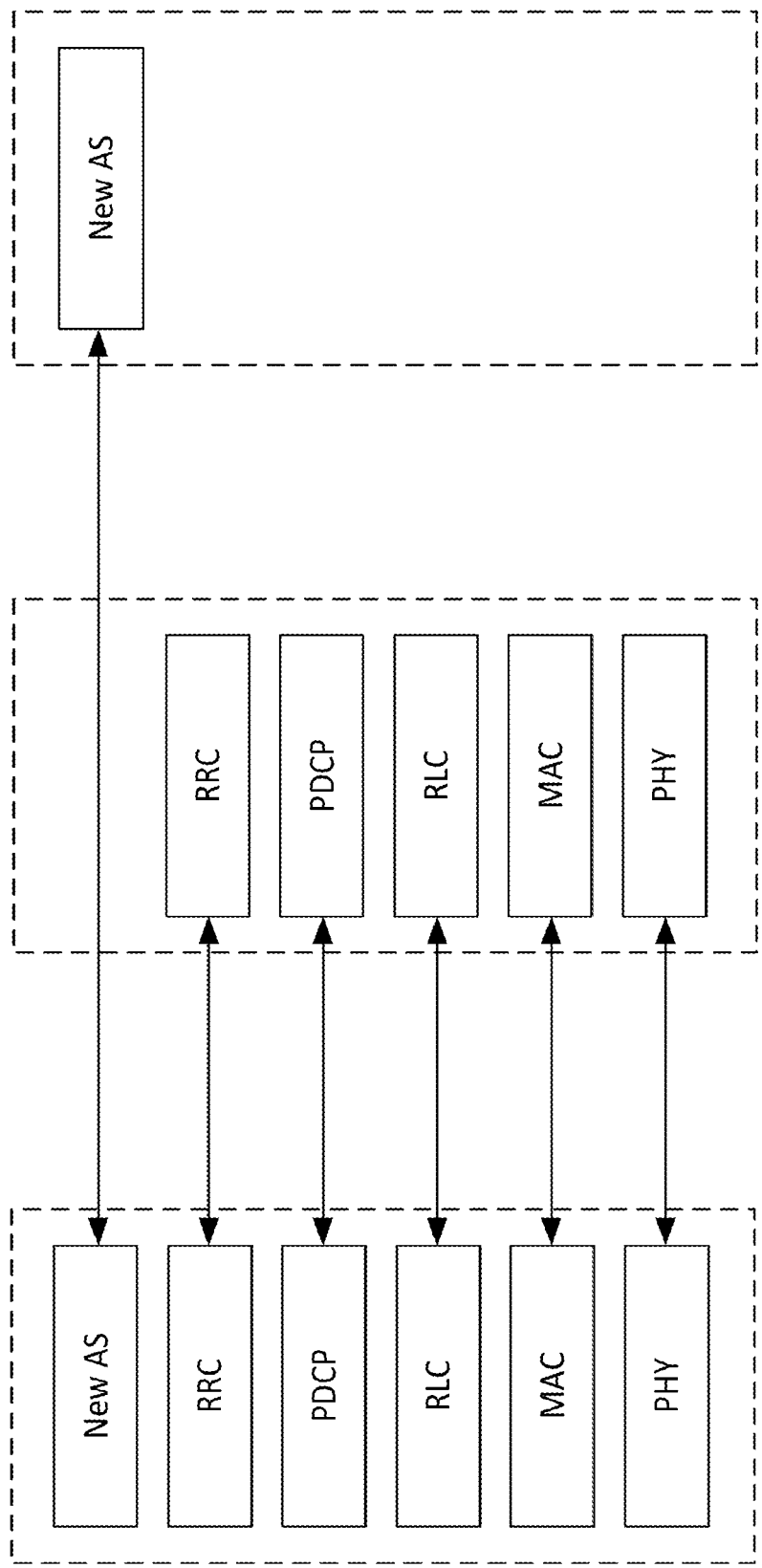
FIG. 7 illustrates a control plane protocol stack of the wireless network of FIG. 2.

FIG. 6 illustrates a user plane protocol stack of the wireless network hitherto described. Further, FIG. 7 illustrates a control plane protocol stack for the network. The terminology for the protocol stack layers is as follows.
PHY—Physical layer
MAC—Medium access control layer
RLC—Radio link control layer
PDCP—Packet data convergence protocol layer
RRC—Radio resource control layer
NAS—Non-access stratum layer
AS—Access stratum layer A network implemented as a 4G Long Term Evolution (LTE) network would have a similar architecture with a slightly different terminology for entities and interfaces. The 4G-LTE network has a similar protocol stack with the exception of the AS layer. However, the actual protocol layer functionality could be different for the two networks.

Figure 8:
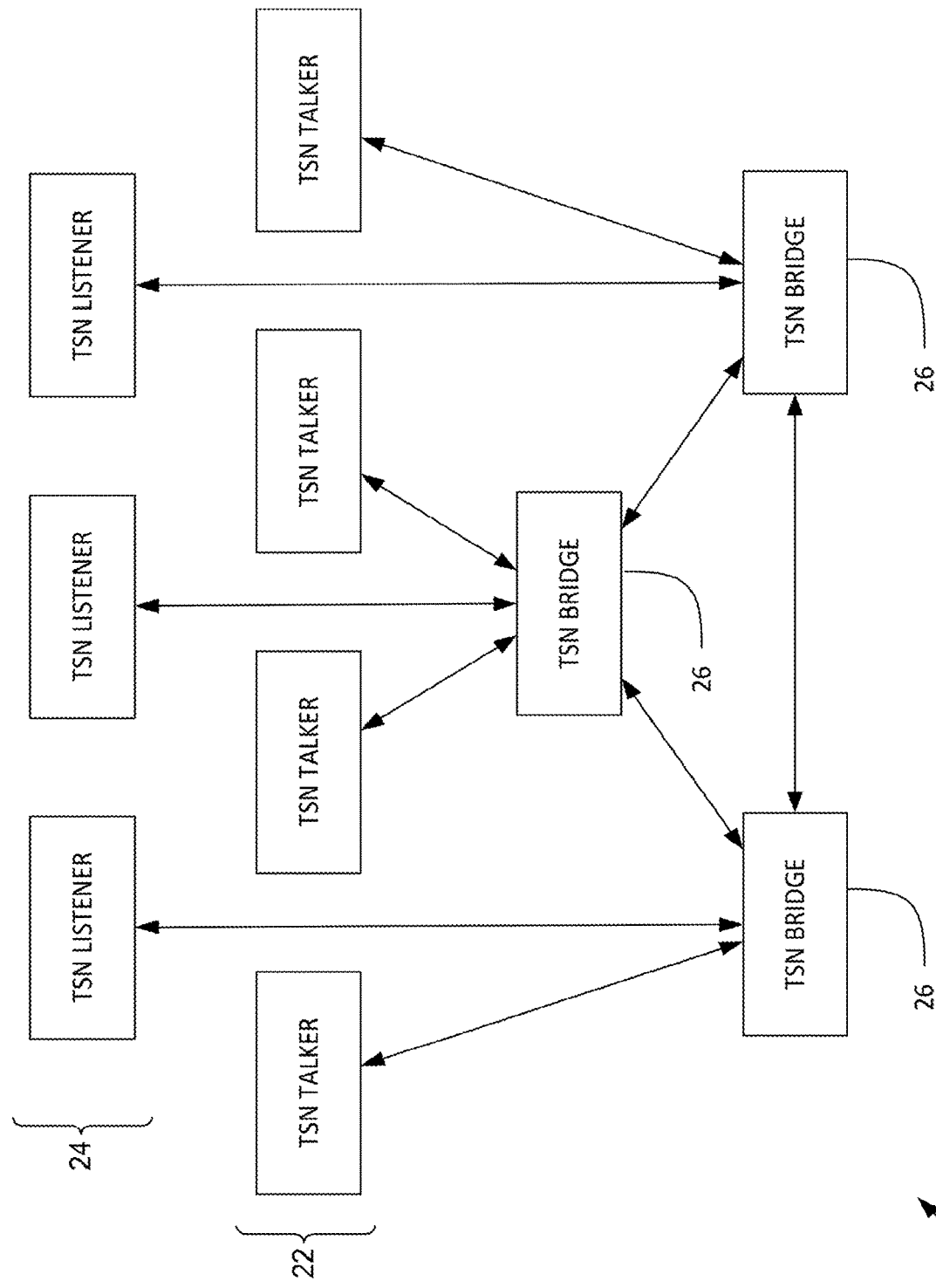
FIG. 8 illustrates a wired network implementing the guided communication network of FIG. 2, in the form of a fully distributed TSN model.

Without any loss of generality for application of presently described embodiments, an example of a fully distributed TSN model is illustrated in FIG. 8. This implements the wired network 20 of FIG. 1. As shown, the TSN network 20 comprises a plurality of TSN end stations, namely TSN talkers 22 (controllers, sensors, etc.) and TSN listeners 24 (actuators, robots, etc.) sharing information over a TSN network comprising of one or more TSN bridges 26. Each of the network elements 22, 24, 26 has an internal clock as will be described in due course. Each end station 22, 24 has a Clock Slave (CS) port capable of receiving a clock signal from a master clock, as will be described in due course.

Figure 9:
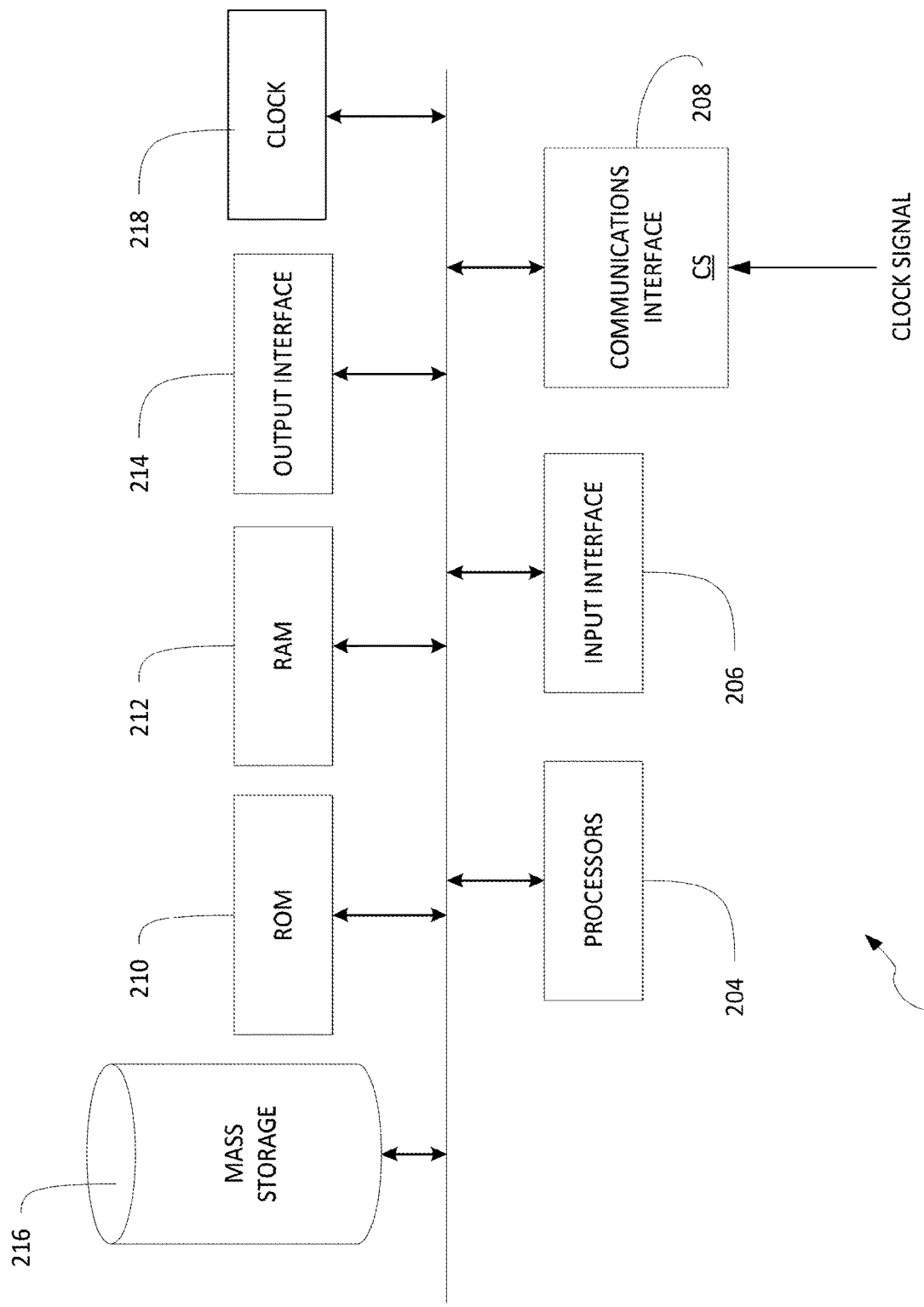
FIG. 9 illustrates a "talker" network element of the wired network of FIG. 8.

FIG. 9 illustrates internal architecture of a "talker" end station 22, in accordance with the present embodiment. As shown in FIG. 9, the end station 22 is a computer apparatus, in structure and function. It may share certain features with general purpose computer apparatus, but some features may be implementation specific, given the specialised function for which the station 22 is to be put. The reader will understand which features can be of general-purpose type, and which may be required to be configured specifically for use in a user device.

The station 20 thus comprises one or more processors 204, either generally provisioned, or configured for other purposes such as mathematical operations, audio processing, managing a communications channel, and so on.

An input interface 206 provides a facility for receipt of user input actions. Such user input actions could, for instance, be caused by user interaction with a specific input unit including one or more control buttons and/or switches, a touchscreen, a keyboard, a mouse or other pointing device, a speech recognition unit enabled to receive and process speech into control commands, a signal processor configured to receive and control processes from another device such as a tablet or smartphone, or a remote-control receiver. This list will be appreciated to be non-exhaustive and other forms of input, whether user initiated or automated, could be envisaged by the reader.

Likewise, an output interface 214 is operable to provide a facility for output of signals to a user or another device. Such output could include a display signal for driving a local video display unit (VDU) or any other device.

A communications interface 208 implements a communications channel, whether broadcast or end-to-end, with one or more recipients of signals. In the context of the present embodiment, the communications interface is configured to cause emission of control signals via an interface not shown for reasons of clarity, for control of other equipment not within the scope of this disclosure. Such equipment could include industrial equipment or the like. The communications interface 208, as shown, has a clock slave port CS through which it can be in receipt of a clock signal from another device to which it has a wired connection.

The processors 204 are operable to execute computer programs, in operation of the end station 20. In doing this, recourse is made to data storage facilities provided by a mass storage device 216 which is implemented to provide large-scale data storage albeit on a relatively slow access basis, and will store, in practice, computer programs and data as the need arises.

A Read Only Memory (ROM) 210 is preconfigured with executable programs designed to provide the core of the functionality of the end station 20, and a Random Access Memory 212 is provided for rapid access and storage of data and program instructions in the pursuit of execution of a computer program. Each of these is configured to implement a communications protocol adopted by plural interoperable devices.

A clock 218 provides a timing signal for all other components of the device. The clock signal is adapted to trigger on the basis of the received clock signal at the CS port, and can be adjusted if required, for synchronization with other devices.

Figure 10:
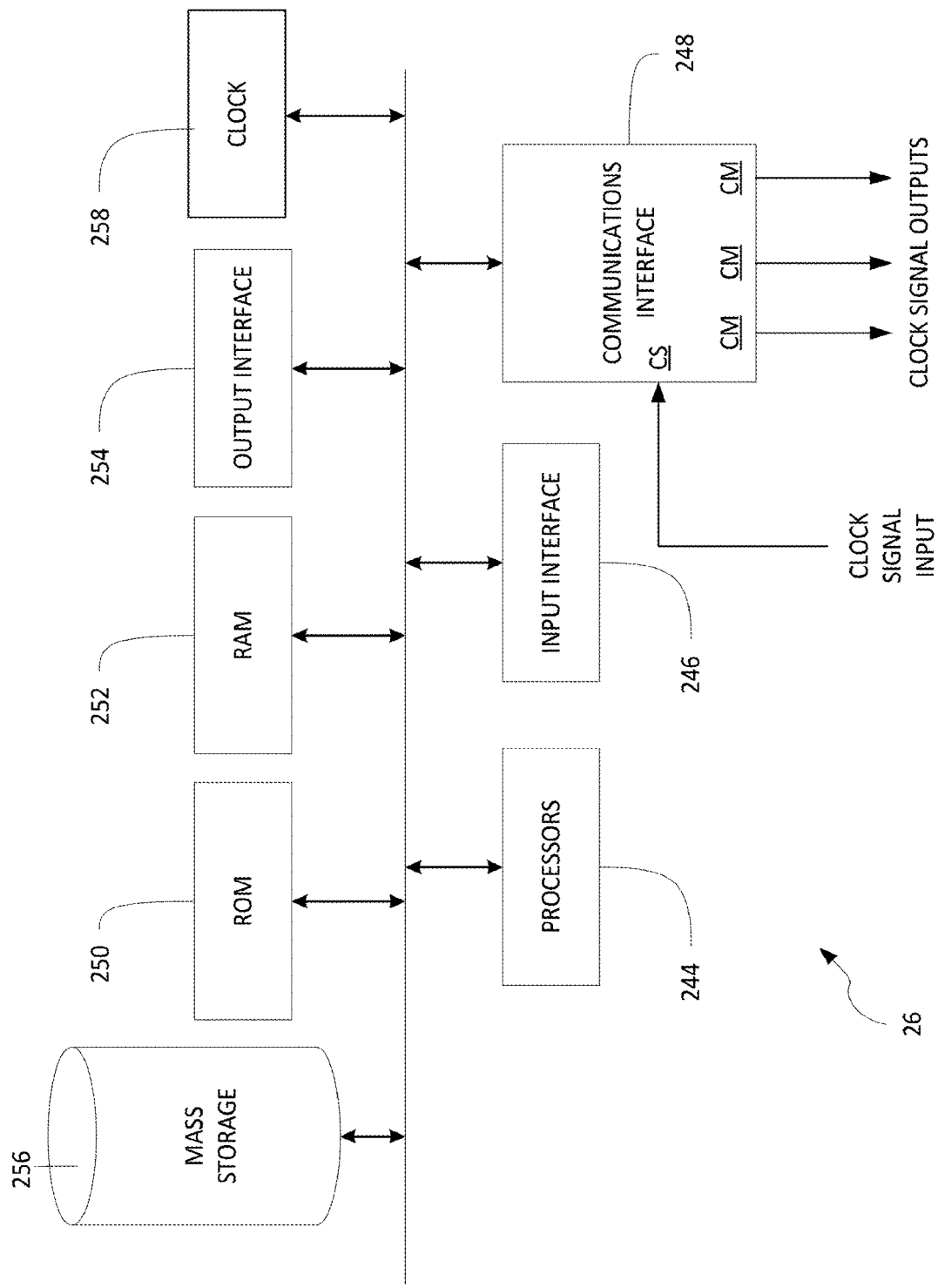
FIG. 10 illustrates a TSN bridge of the wired network of FIG. 9.

FIG. 10 illustrates internal architecture of a TSN bridge in accordance with the present embodiment . . . .

As shown in FIG. 10, the bridge 26 is a computer apparatus, in structure and function. It may share certain features with general purpose computer apparatus, but some features may be implementation specific, given the specialised function for which the bridge 26 is to be put. The reader will understand which features can be of general-purpose type, and which may be required to be configured specifically for use in a user device.

The bridge 26 thus comprises one or more processors 244, either generally provisioned, or configured for other purposes such as mathematical operations, audio processing, managing a communications channel, and so on.

An input interface 226 provides a facility for receipt of user input actions. Such user input actions could, for instance, be caused by user interaction with a specific input unit including one or more control buttons and/or switches, a touchscreen, a keyboard, a mouse or other pointing device, a speech recognition unit enabled to receive and process speech into control commands, a signal processor configured to receive and control processes from another device such as a tablet or smartphone, or a remote-control receiver. This list will be appreciated to be non-exhaustive and other forms of input, whether user initiated or automated, could be envisaged by the reader.

Likewise, an output interface 234 is operable to provide a facility for output of signals to a user or another device. Such output could include a display signal for driving a local video display unit (VDU) or any other device.

A communications interface 248 implements a communications channel, whether broadcast or end-to-end, with one or more recipients of signals. In the context of the present embodiment, the communications interface is configured to cause onward transmission of signals received at the device, intended for another destination. The communications interface 248, as shown, has a clock slave port CS through which it can be in receipt of a clock signal from another device to which it has a wired connection. Further, the communications interface 248 comprises one or more clock master ports CM which, when activated, cause emission of a master clock signal for used by other connected devices.

The processors 244 are operable to execute computer programs, in operation of the bridge 26. In doing this, recourse is made to data storage facilities provided by a mass storage device 256 which is implemented to provide large-scale data storage albeit on a relatively slow access basis, and will store, in practice, computer programs and data as the need arises.

A Read Only Memory (ROM) 250 is preconfigured with executable programs designed to provide the core of the functionality of the bridge 26, and a Random Access Memory 252 is provided for rapid access and storage of data and program instructions in the pursuit of execution of a computer program. Each of these is configured to implement a communications protocol adopted by plural interoperable devices.

A clock 258 provides a timing signal for all other components of the device. The clock signal is adapted to trigger on the basis of the received clock signal at the CS port, and can be adjusted if required, for synchronization with other devices.

As noted, bridges 26 have a CS port and at least one Clock Master (CM) port. In use, one of the bridges 26 will be nominated as the host of the master clock, by a master clock selection algorithm. Master clock selection algorithms are known in the field. This nominated bridge 26 will serve its clock by way of its CM port to all other network elements directly connected to it, connections being effected by signal guides such as electrical signal cables.

Each other bridge 26, receives at its CS port the master clock signal generated by the nominated bridge 26. It then serves the master clock signal to other network elements to which it is connected. In one embodiment, the bridge 26 has a plurality of CM ports, and each connected network element is allocated one of these ports for its unique use, to obtain the clock signal. In another embodiment, one or more CM ports can be shared between network devices connected to the bridge 26.

Any delay to the clock signal resultant from residence at bridges or from propagation delays on connectors can be accounted for using reference back to the bridge 16 hosting the master clock. So, by sending and receiving time-stamped messages between network elements, delays can be measured and compensated for.

Figure 11:
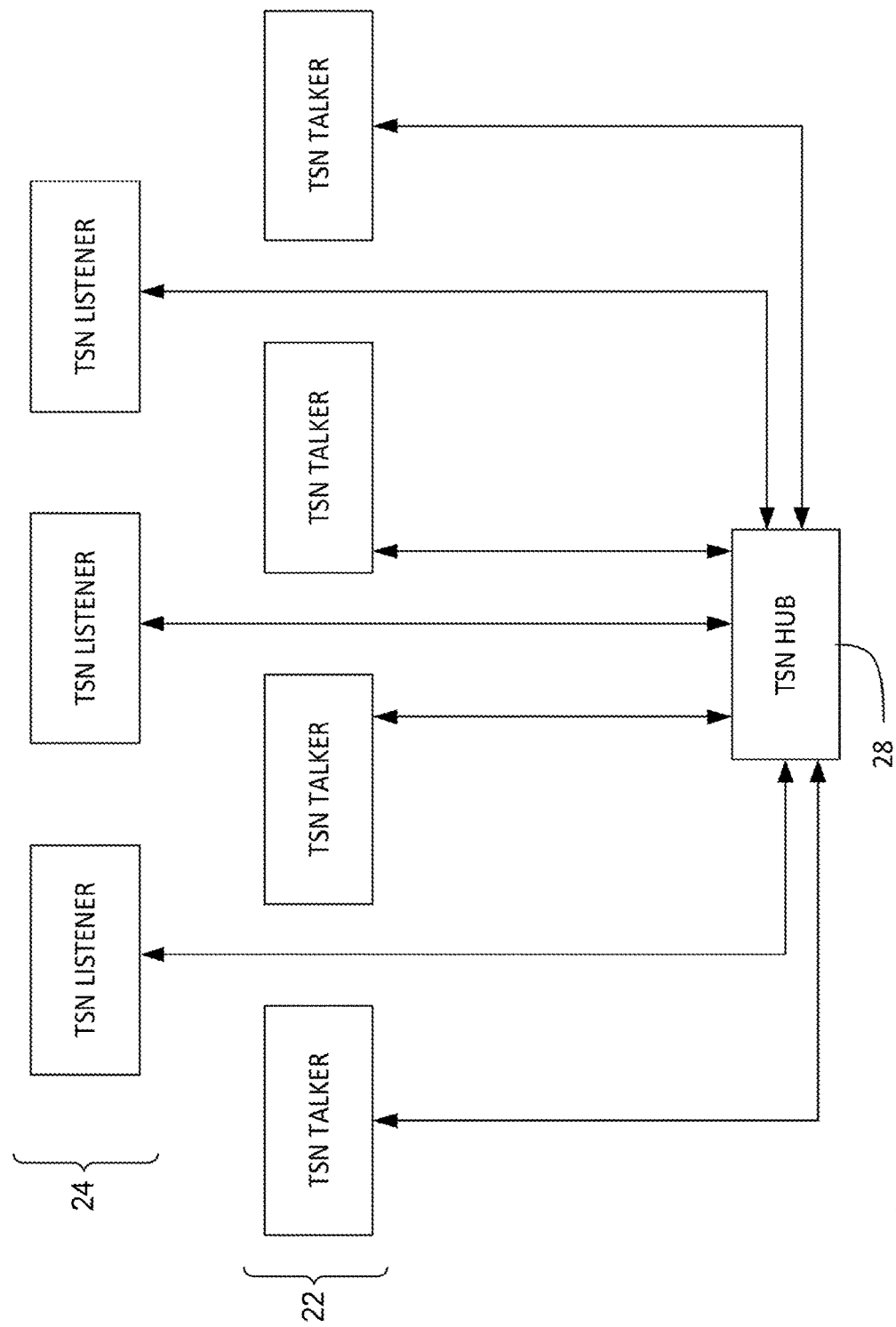
FIG. 11 illustrates a wired network implementing the guided communication network of FIG. 2, in the form of a fully centralised TSN model.

FIG. 11 further illustrates a network 20' which is fully centralised around a TSN hub 28 operating as a network manager. The architecture of the TSN hub 28 is the same as the TSN bridge 26 previously described, having a plurality of CM ports for distribution of a grandmaster clock signal.

In this case, a clock signal is established by the TSN hub 128 and distributed directly to end stations 22, 24. The end stations 22, 24 are of same form and function as the end stations 22, 24 of the preceding embodiment. Again, elements are connected using guided signal connections such as electrical cables.

Figure 12:
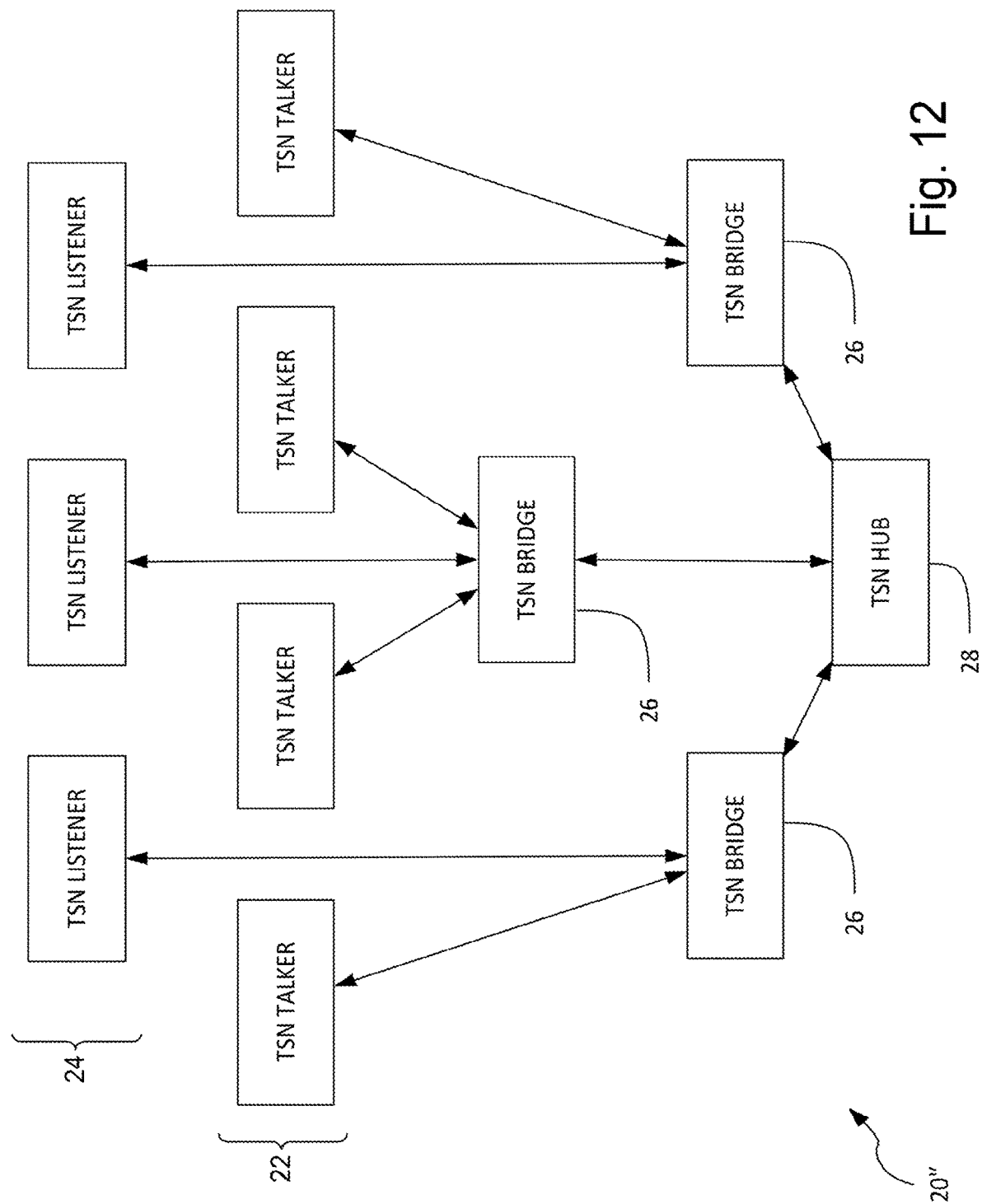
FIG. 12 illustrates a wired network implementing the guided communication network of FIG. 2, in the form of a partially distributed TSN model.

FIG. 12 illustrates a network 20" which is partially centralised, including a TSN hub 28 connected to TSN bridges 26 which are then connected to end devices 22, 24. Bridges 26 are used to distribute a clock signal, generated by the TSN hub 28, to the end devices 22, 24.

The end stations 22, 24, the bridges 26 and the hub 28 are of same form and function as respective components of preceding embodiments. Again, elements are connected using guided signal connections such as electrical cables.

In each of the following embodiments, the exact configuration of the TSN network is not material to the scope of the disclosure. The configurations described above are but examples, and are not limiting on the present disclosure.

In general terms, two distinct scenarios are identified for tight integration of a guided communication network and a wireless network, in accordance with the present disclosure.

A first scenario is named the TSN link model wherein the wireless system appears as a wired system link. In this arrangement, the TSN network 20 (or 20', 20", as the case may be) connects with the wireless system 30.

A second scenario is named the TSN bridge model wherein the wireless system 30 appears as a bridge or a black box on the wired network (20, 20', 20").

The TSN bridge model requires distinct entities known as TSN translators at the edge of the network, i.e., on the user equipment (UE) side and the core network (CN) side. TSN translators encapsulate the 5G network into a TSN bridge. The TTs handle TSN-specific operations such as timestamping, thus minimising changes to the 5G system.

Time synchronization in TSN is governed by the generalized precision time protocol (gPTP) of IEEE 802.1AS standard, which is a profile of the well-known precision time protocol (PTP) defined by the IEEE 1588 standard. The gPTP provides reliable time synchronization which can be used by other TSN standards. PTP operation in this context will now be described.

PTP Operation

Figure 13:
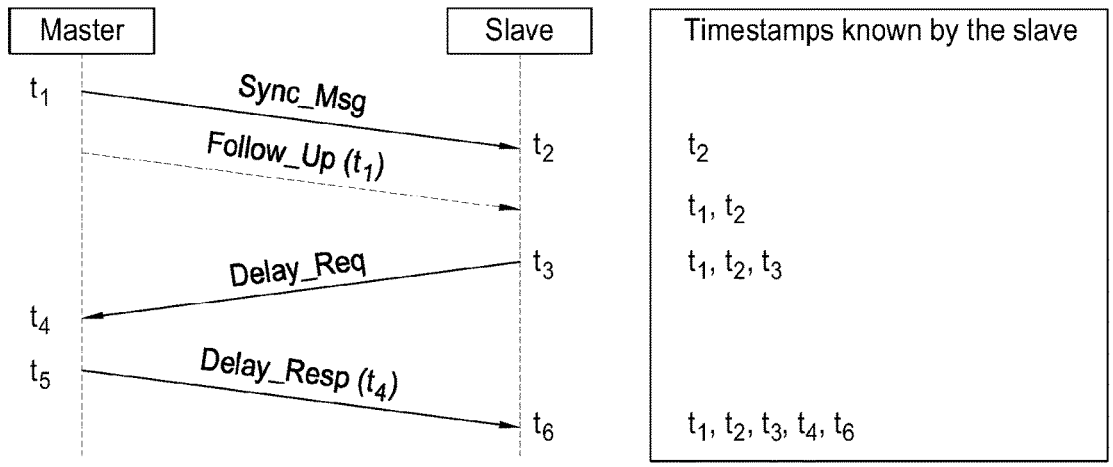
FIG. 13 illustrates a swimlane diagram for communication between a master clock holding device and a slave clock holding device, demonstrating PTP operation.

PTP defines time synchronization between a master clock and a slave clock. The master is the provider of the time signal and the slave synchronizes to the master time signal. A grandmaster is a master that is synchronized to a time reference (e.g., GPS). The master clock provides time synchronization messages that are used by the slaves to correct their local clocks. FIG. 13 shows a swimlane diagram illustrating the exchange of information between a device holding the master clock and a device holding a slave clock, for the operation of PTP. Four timestamps are captured between the master clock and the slave clock. These timestamps are used to synchronize the slave clock to the master clock.

Any clock difference between the time maintained at the master clock and the time maintained at the slave clock is a combination of the clock offset and message transmission delay. Hence, PTP corrects the clock difference based on offset correction and delay correction.

The master initiates the correction process by sending a synchronization message (Sync_Msg). The first timestamp is $t_1$, which is the precise time at which the Sync_Msg is sent from the master. The slave uses its local clock to timestamp the arrival of the Sync_Msg. This timestamp is denoted by $t_2$. The master then transmits its own timestamp $t_1$ in a follow up (Follow_Up) message to the slave.

The slave calculates the difference between the two timestamps $t_1$, $t_2$. This difference represents the sum of the offset of the slave clock and the link delay from the master to the slave.

A second set of messages is issued to enable the network to account for network delay variations. In this second set, the slave transmits a delay request (Delay_Req) message and timestamps the instant $t_3$ when it was sent. The master timestamps the arrival of the Delay_Req message, i.e., $t_4$. It then sends a delay response (Delay_Resp) message, carrying the timestamp $t_4$, to the slave. The difference between the timestamps is the slave to master link delay. Given the earlier calculation, it is possible for the slave to calculate clock offset as follows:

$$\text{Offset} = t_2 - t_1 - \text{Link\_Delay}$$

$$\text{Link\_Delay} = 0.5 \times [(t_2 - t_1) + (t_4 - t_3)]$$

$$\text{Offset} = 0.5 \times [(t_2 - t_1) - (t_4 - t_3)]$$

The reader will note that the offset correction assumes that link delay is symmetric, i.e., propagation time from master to slave is equal to the propagation time from slave to master. This is typically the case in wired networks. Application of PTP for wireless clock synchronization creates various challenges. Since the master and slave clocks drift independently, periodic offset and delay correction is necessary to maintain clock synchronization.

It is emphasized that the Follow_Up message is not needed if the Sync_Msg gets an accurate timestamp placed in the message on-the-fly as it is about to leave the master.

The IEEE 802.1AS standard defines a propagation delay measurement procedure between two peer nodes (a peer delay initiator and a peer delay responder) through exchange of timestamps via path delay request and path delay response messages.

Transport of Time Synchronization Information (IEEE 802.1AS)

Figure 14:
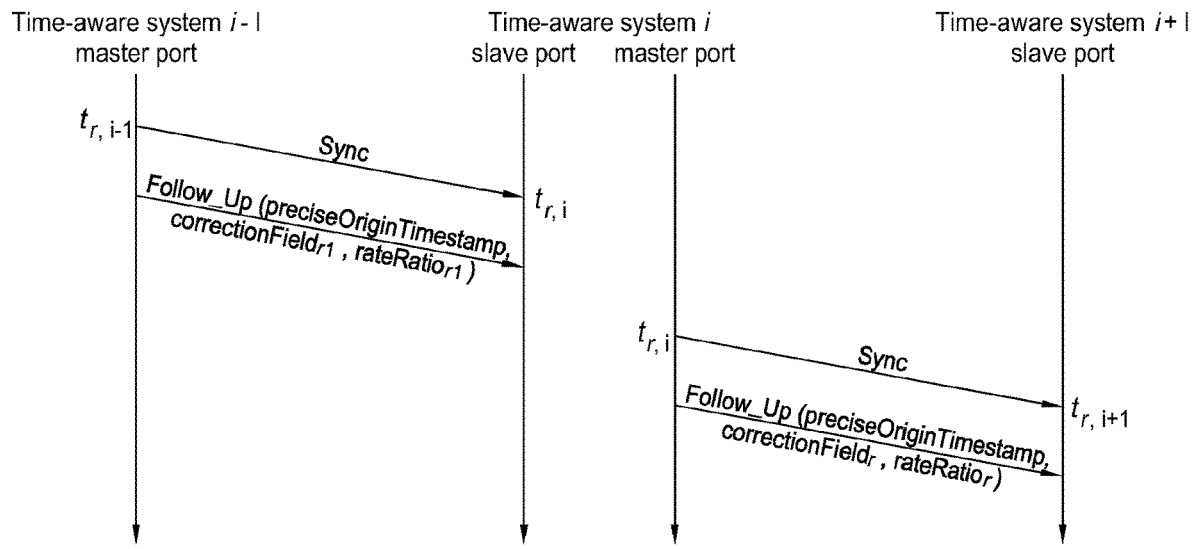
FIG. 14 shows a swimlane diagram of communication between three adjacent time-aware systems, in accordance with an embodiment.

The IEEE 802.1AS standard also specifies transport of time synchronization information over multiple time-aware (wired) systems. FIG. 14 shows a swimlane diagram of communication between three adjacent time-aware systems, indexed i−1, i, and i+1. Synchronization is transported from time-aware system i−1 to time-aware system i, and then to time-aware system i+1. Time-aware system i−1 sends a Sync message (Sync_Msg) to time-aware system i at time $t_{s,i-1}$, relative to the LocalClock entity of time-aware system i−1.

At a later time, time-aware system i−1 sends an associated Follow_Up message to time-aware system i, which contains a preciseOriginTimestamp, correctionField$_{i-1}$, and rateRatio$_{i-1}$. The preciseOriginTimestamp contains the time of the grandmaster when it originally sent this synchronization information. It is not indexed here because it normally does not change as the Sync and Follow_Up messages traverse the network. The quantity correctionField$_{i-1}$ contains the difference between the synchronized time when the Sync message is sent (i.e., the synchronized time that corresponds to the local time $t_{s,i-1}$) and the preciseOriginTimestamp. The sum of preciseOriginTimestamp and correctionField$_{i-1}$ gives the synchronized time that corresponds to $t_{s,i-1}$. The quantity rateRatio$_{i-1}$ is the ratio of the grandmaster frequency to the frequency of the LocalClock entity of time-aware system i−1.

Time-aware system i receives the Sync message from time-aware system i−1 at time $t_{r,i}$, relative to its LocalClock entity. It timestamps the receipt of the Sync message, and the timestamp value is $t_{r,i}$. It receives the associated Follow_Up message some time later.

Time-aware system i will eventually send a new Sync message at time $t_{s,i}$, relative to its LocalClock entity. It will have to compute correctionField$_i$, i.e., the difference between the synchronized time that corresponds to $t_{s,i}$ and the preciseOriginTimestamp. To do this, it must compute the value of the time interval between $t_{s,i-1}$ and $t_{s,i}$, expressed in the grandmaster time base. This interval is equal to the sum of the propagation delay between time-aware systems i−1 and i, expressed in grandmaster time base, and the difference between $t_{s,i}$ and $t_{r,i}$ (i.e., the residence time), expressed in the grandmaster time base.

Approaches for Time Synchronization in Present Embodiments

Present embodiments provide two different scenarios to achieve time synchronization that are aligned with IEEE 802.1AS and ongoing activities within 3GPP.

In a first approach, referred to herein as the Boundary Clock Approach, the 5G RAN has direct access to the TSN grandmaster clock. The RAN provides timing information to the UEs via signaling and procedures of the 5G system. Based on this timing information, the UEs synchronize TSN devices.

In a second approach, referred to herein as the Transparent Clock Approach, time synchronization is achieved via PTP messages. Any intermediate 5G or TSN entity between a TSN grandmaster and the TSN device updates PTP messages to correct for time spent in the entity.

These two approaches will now be explored in the following embodiments.

Embodiment 1: Boundary Clock Approach with Over-the-Air Synchronization

Figure 15:
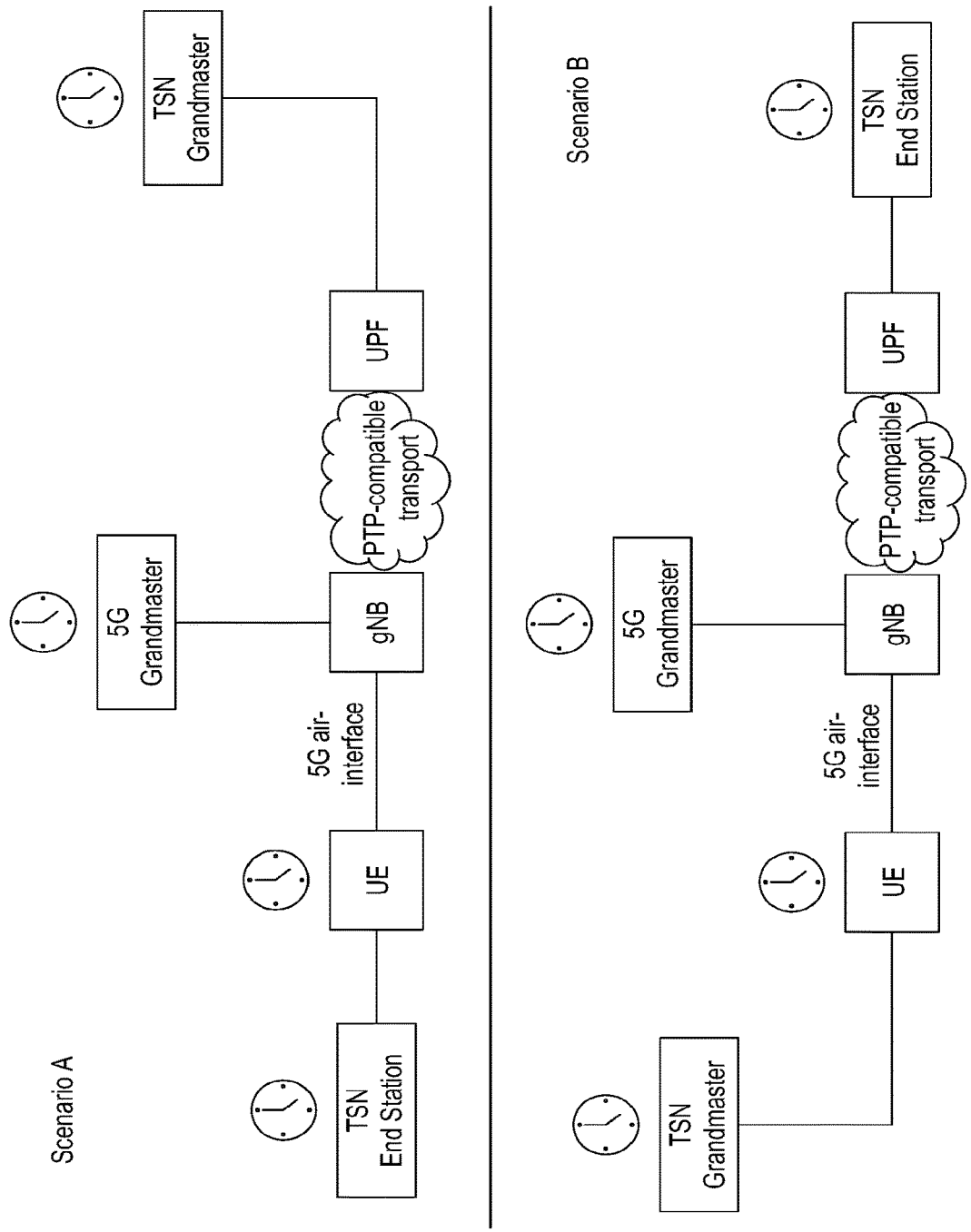
FIG. 15 illustrates two configuration scenarios for implementation of embodiments.

In this embodiment, the 5G RAN has direct access to the TSN grandmaster clock. Time synchronization between a TSN device and the TSN grandmaster is achieved through 5G RAN-specific signaling procedures. The 5G RAN does not need to be compliant with IEEE 802.1AS. The 5G RAN can have direct connectivity to the TSN grandmaster clock via the underlying PTP-compatible transport network. This embodiment has two distinct scenarios which are illustrated schematically in FIG. 15.

Scenario A: TSN grandmaster clock is located at the gNB side, i.e., the UE is responsible for synchronizing the TSN end station.

Scenario B: The best master clock algorithm (BMCA) can detect if the best grandmaster clock is at the UE side. Therefore, in this scenario, the TSN grandmaster clock is located at the UE side, i.e., the gNB is responsible for synchronizing the TSN end station.

Figure 16:
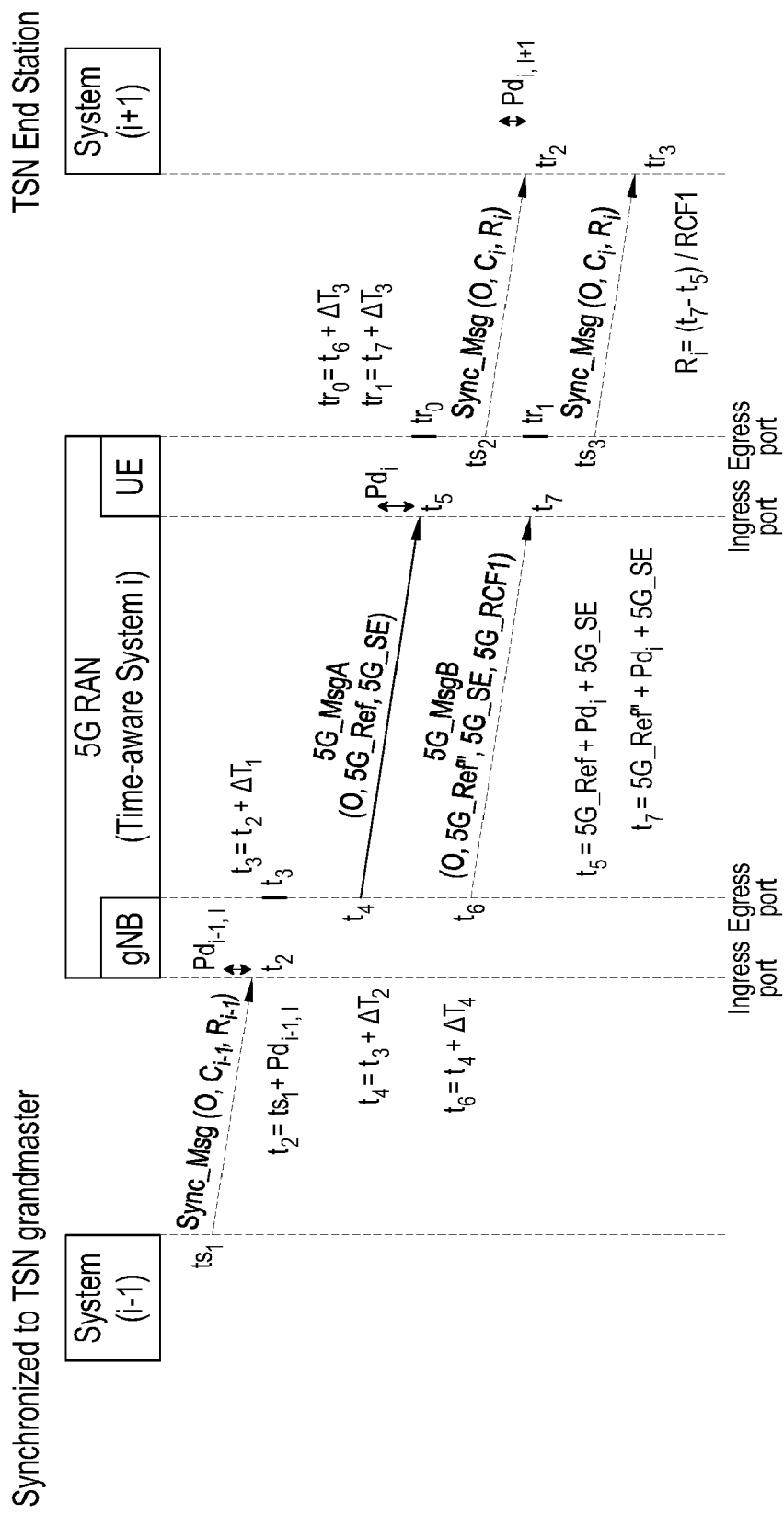
FIG. 16 illustrates a swimlane diagram of a time synchronization process of an embodiment.

First, the time synchronization process in Scenario A is illustrated through FIG. 16. It will be noted that the gNB has an ingress port toward system i−1 and an egress port toward 5G RAN. Similarly, the UE has an ingress port toward 5G RAN and an egress port toward system i−1. The system i−1 is time synchronized to the TSN grandmaster based on IEEE 802.1AS. Similarly, system i+1 (which represents a TSN end station) would be time synchronized to system i through IEEE 802.1AS. Key steps for achieving time synchronization in this scenario are described as follows.

1. System i−1 transmits a Sync_Msg at time $ts_1$ which contains the preciseOriginTimestamp (O), the correctionField (C) and the rateRatio (R). If the TSN grandmaster is directly connected to the gNB then $O=ts_1$.
2. The gNB receives the Sync_Msg from system i−1 at its ingress port at time $t_2$. It calculates the grandmaster time at $t_2$ by adding the path delay ($Pd_{i-1,i}$), i.e., $t_2=ts_1+Pd_{i-1,i}$.
3. The gNB computes the equivalent time in 5G time base, denoted by $t_3$, when the time TSN time was $t_2$. This is given by $t_3=t_2+\Delta T_1$, where $\Delta T_1$ denotes the difference between the TSN time base and the 5G time base at the gNB.
4. The gNB transmits a 5G message at its egress port at time $t_4$, denoted by 5G_MsgA, that contains the preciseOriginTimestamp (O), a 5G system time reference parameter, denoted by 5G_Ref, and a 5G system error correction parameter, denoted by 5G_SE. The 5G_Ref parameter indicates the reference time in 5G time base when the TSN time was equal to preciseOriginTimestamp (O). The 5G_SE parameter accounts for any timing errors specific to the 5G system and the 5G air-interface. The time $t_4$ accounts for any time spent in the gNB before 5G_MsgA is transmitted on the air-interface, which is denoted by $\Delta T_2$, i.e., $t_4=t_3+\Delta T_2$.
5. The UE receives the 5G_MsgA at its ingress port at time $t_5$ which is denoted by $t_5=5G\_Ref+Pd_i+5G\_SE$. Note that there is no explicit delay measurement in the 5G system as per IEEE 802.1AS. However, the path delay can be estimated from the timing advance (TA) value for a UE. Timing advance is used to adjust the uplink transmission time of the devices based on their respective propagation delays in order to avoid collisions at the base station (gNB). The TA is a negative offset at the UE and aligns downlink and uplink frames. Hence, $t_5=5G\_Ref+TA/2+5G\_SE$, where the factor TA/2 accounts for gNB to UE propagation delay.
6. The 5G SE parameter accounts for different types of timing errors. Initially, its value is set to zero. One such error arises to the frequency offset between the gNB clock and the clock of the system i−1. This is captured by the rateRatio parameter from system i−1, i.e., $R_{i-1}$. To convert the transmission time of 5G_MsgA with reference to the TSN grandmaster time, the gNB calculates the frequency offset error as $(t_4-t_3)\times R_{i-1}$ Hence, 5G_SE is incremented by the frequency offset error, i.e., $5G\_SE+=(t_4-t_3)\times R_{i-1}$.
7. The UE computes the equivalent time in TSN time base, denoted by $tr_0$, when the 5G RAN time was $t_5$. This is given by $tr_0=t_5+\Delta T_3$, where $\Delta T_3$ denotes the difference between the 5G time base and the TSN time base at the UE.
8. Dual Message Time Synchronization—The UE can possibly provide time synchronization information to system i+1 based on a single message transmission from gNB, i.e., 5G_MsgA. However, such time synchronization would be incomplete as the UE has no information regarding the rate ratio parameter ($R_i$). The reader will note that 5G_MsgA can be repeated to have an estimate of $R_i$ based on its transmission time. However, this might be inaccurate due to frequency offset between the gNB clock and the UE clock. Therefore, a dual message time synchronization is proposed wherein the UE provides time synchronization information to system i+1 based on two received messages from the gNB, i.e., 5G_MsgA and 5G_MsgB. The 5G_MsgB is similar to 5G_MsgA with the exception that it updates 5G_Ref to 5G_Ref" to account for the delay from 5G_Ref to transmission of 5G_MsgB and includes an additional parameter that provides supplementary information for estimating Ri. This is the 5G rate correction factor (5G_RCF1) parameter.
9. The gNB transmits 5G_MsgB at time t6 which is given by t6=t4+ΔT4, where ΔT4 accounts for the delay on the air-interface before transmission of 5G_MsgB.
10. The 5G_MsgB contains a 5G_SE parameters which is given by 5G_SE+=(t6−t3)×Ri−1. In case of dual message time synchronization, the UE considers the 5G_SE value from 5G_MsgB only.
11. The UE receives 5G_MsgB at time t7 which is given by t7=5G_Ref"+TA/2+5G_SE. The UE computes the equivalent time in TSN time base, denoted by tr1, when the 5G RAN time was t7. This is given by tr1=t7+ΔT3, where ΔT3 denotes the difference between the 5G time base and the TSN time base at the UE.

12. Based on dual message time synchronization, the UE computes the equivalent time in TSN time base, denoted by tr1, when the 5G RAN time was t7. This is given by tr1=t7+ΔT3, where ΔT3 denotes the difference between the 5G time base and the TSN time base at the UE.
13. Based on dual message time synchronization, the UE will eventually send a Sync_Msg at its egress port at time ts3. It will have to compute a correction Field (Ci) parameter and a rateRatio parameter (Ri). The Ci parameter is given by Ci=(ts3−tr1). The Ri parameter is given by (t7−t5)/RCF1 where RCF1 is given by (t6−t4).
14. System i+1 synchronizes with the TSN grandmaster at time tr3 which is given by tr3=O+Pdi,i+1+Ci×Ri.

Transmission of 5G_MsgA and 5G_MsgB: In some embodiments encompassed by this disclosure, 5G_MsgA and 5G_MsgB are transmitted as system information broadcast (SIB) messages either periodically or dynamically. One candidate is the SIB16 message which is used for transmitting GPS-related information. However, SIB messages are broadcast in nature. In co-existing TSN and non-TSN applications, 5G_MsgA and 5G_MsgB must be transmitted as unicast or multi-cast through the physical downlink shared channel (PDSCH).

Figure 17:
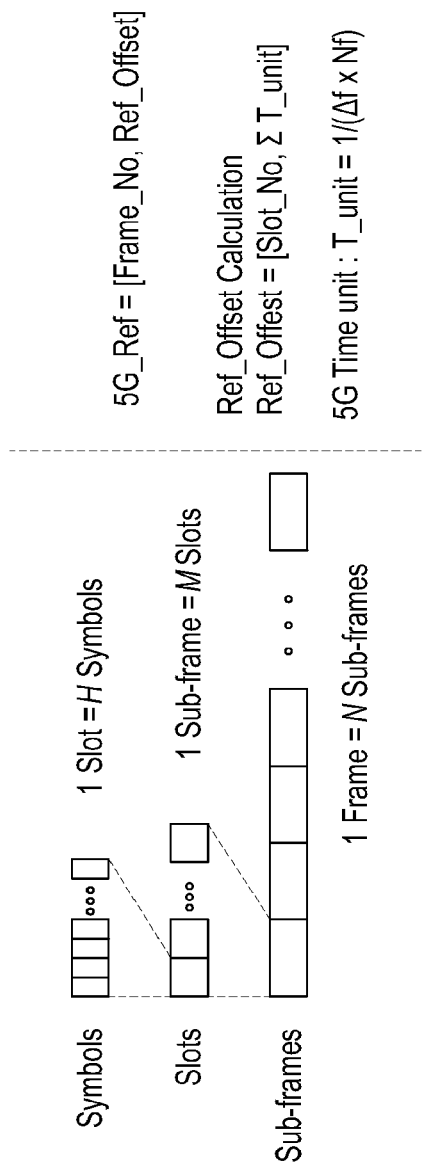
FIG. 17 illustrates structure of a 5G signal to demonstrate basic time units in 5G.

Reference Time in 5G: This is illustrated through FIG. 17. The basic time unit in 5G is given by T_unit=1/(Δf×Nf) where Δf=480 kHz and Nf=4096. The 5G air-interface represents a time-slotted system of repetitive frames. Each frame consists of multiple sub-frames and each sub-frame further comprises of multiple slots. Further, each slot comprises a fixed number of OFDM symbols. The reference time in 5G system which corresponds to the TSN grandmaster time, i.e., 5G_Ref is represented by a reference frame number and a reference offset (Ref_Offset). In some embodiments, the Ref_Offset represents a slot number only, i.e., 5G_Ref indicates a specific slot within the reference frame. In other embodiments, the Ref_Offset consists of a slot number and cumulative 5G basic time units, i.e., 5G_Ref indicates the specific time inside the reference frame and slot.

Time of Arrival Errors: In the absence of any time of arrival measurement, the timing advance value is used as an approximation of the time of arrival. Each timing advance value may correspond to a range of time of arrival values. Hence, the timing advance value can lead to a maximum time synchronization error of $\pm 128 \times T\_unit/2^\mu$, where $\mu=0, 1, 2, \ldots$ indicates the numerology factor.

Figure 18:
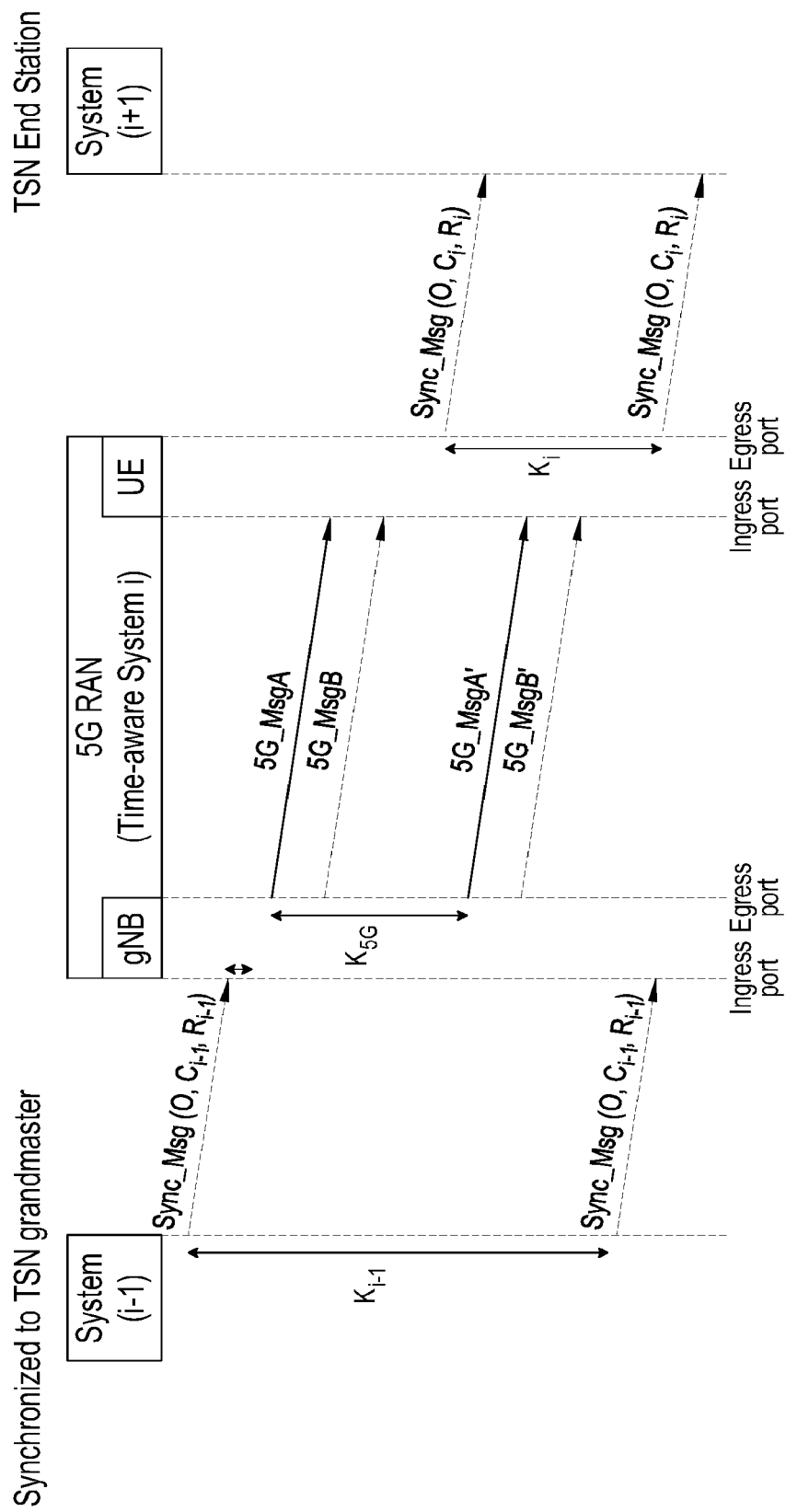
FIG. 18 illustrates a swimlane diagram of a method of accounting for drift errors.

Clock Drift Errors: In some embodiments of the present disclosure, 5G_MsgA and 5G_MsgB are periodically repeated to account for clock drift errors, as illustrated in FIG. 18. The periodicity ($K_{5G}$) of these messages is determined by the arrival rate ($K_{i-1}$) of synchronization messages from system i−1 and the drift of the clock of system i−1. The repeated 5G_MsgA and 5G_MsgB, denoted by 5G_MsgA' and 5G_MsgB', respectively, correct for the clock drift errors through the 5G_SE parameter.

Slot Errors: If the 5G_Ref only indicates a specific timeslot then an average slot error needs to be considered which is given by T_Dur/2, where T_Dur represents the slot duration. The slot errors can also be modeled accurately based on random probability distributions. It will be understood that a higher numerology is attractive in terms of reducing slot errors.

Figure 19:
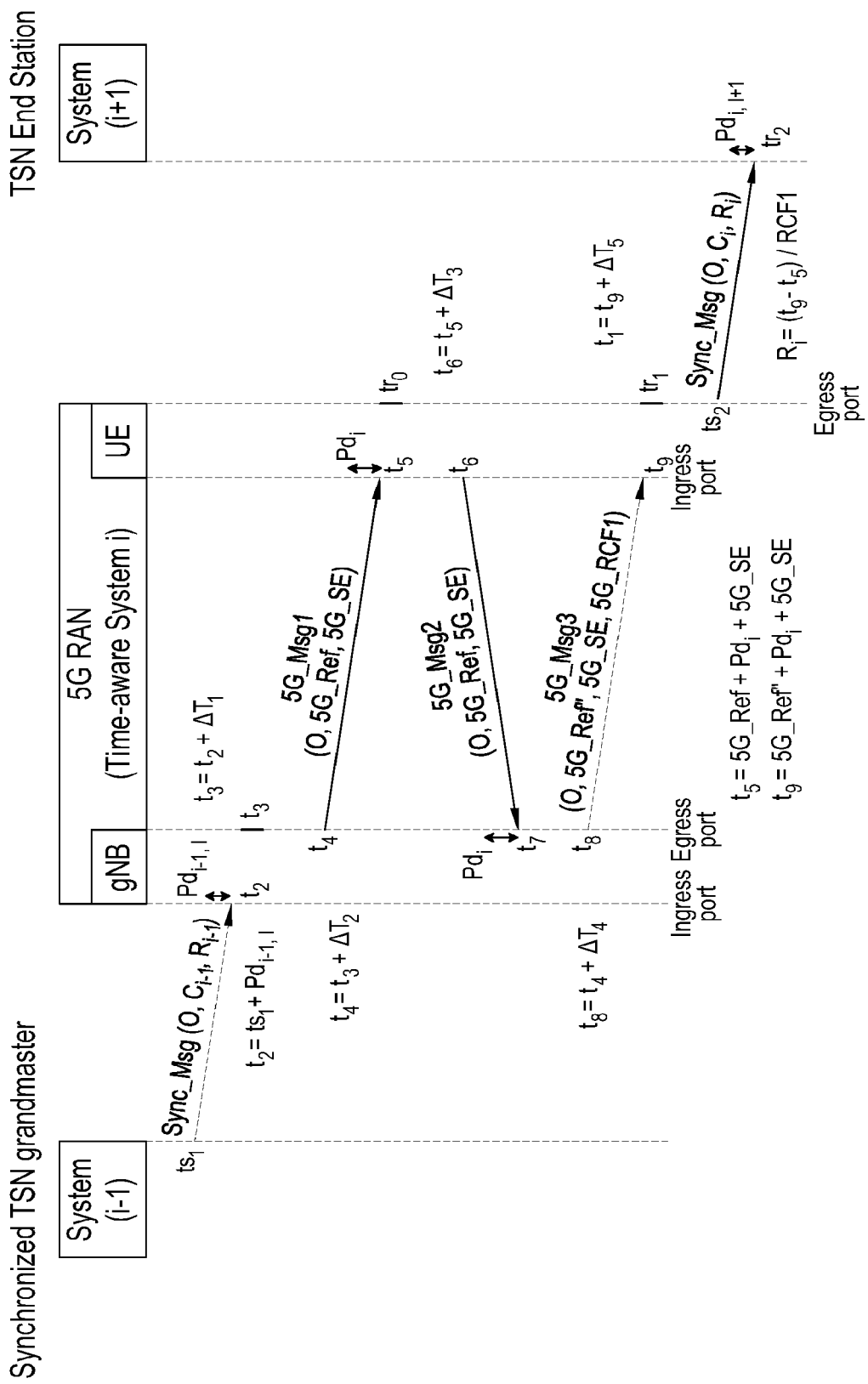
FIG. 19 illustrates a swimlane diagram of a time synchronization process of an embodiment.

Next, the time synchronization process in Scenario B is explained. This is illustrated through FIG. 19. It will be noted that the UE has an ingress port toward system i−1 and an egress port toward 5G RAN. Similarly, the gNB has an ingress port toward 5G RAN and an egress port toward system i+1. The system i−1 is time synchronized to the TSN grandmaster based on IEEE 802.1AS. Similarly, system i+1 (which represents a TSN end station) would be time synchronized to system i through IEEE 802.1AS. Key steps for achieving time synchronization in this scenario are described as follows.

1. System i−1 transmits a Sync_Msg at time $ts_1$ which contains the preciseOriginTimestamp (O), the correction Field (C) and the rateRatio (R). If the TSN grandmaster is directly connected to the UE then $O=ts_1$.
2. The UE receives the Sync_Msg from system i−1 at its ingress port at time $t_2$. It calculates the grandmaster time at $t_2$ by adding the path delay ($pd_{i-1,i}$), i.e., $$t_2 = ts_1 + Pd_{i-1,i}.$$

3. The UE computes the equivalent time in 5G time base, denoted by $t_3$, when the time TSN time was $t_2$. This is given by $t_3=t_2+\Delta T_1$, where $\Delta T_1$ denotes the difference between the TSN time base and the 5G time base at the UE.
4. The UE transmits a 5G message at its egress port at time $t_4$, denoted by 5G_Msg1, that contains the preciseOriginTimestamp (O), a 5G system time reference parameter, denoted by 5G_Ref, and a 5G system error correction parameter, denoted by 5G_SE. The 5G_Ref parameter indicates the reference time in 5G time base when the TSN time was equal to preciseOriginTimestamp (O). The 5G_SE parameter accounts for any timing errors specific to the 5G system and the 5G air-interface. The time $t_4$ accounts for any time spent in the RAN before 5G_Msg1 is transmitted on the air-interface, which is denoted by $\Delta T_2$, i.e., $t_4=t_3+\Delta T_2$.
5. The gNB receives the 5G_Msg1 at its ingress port at time $t_5$ which is given by $t_5=5G\_Ref+Pd_i+5G\_SE$. Hence, $t_5=5G\_Ref+TA/2+5G\_SE$, where the factor TA/2 accounts for UE to gNB propagation delay.
6. The 5G SE parameter accounts for different types of timing errors. Initially, its value is set to zero.
7. The gNB transmits a 5G message at its ingress port, denoted by 5G_Msg2, at time $t_6$ which accounts for the air-interface delay for transmission, i.e., $t_6=t_5+\Delta T_3$. The 5G_Msg2 is required because of two main reasons. First, it provides updates to the 5G_SE parameter from the gNB. Second, it provides resource allocation for the subsequent message transmission from the UE. The UE receives 5G_Msg2 at time $t_7$.
8. The UE transmits a 5G message at its ingress port, denoted by 5G_Msg3, at time at time $t_8$ which accounts for the air-interface delay for transmission, i.e., $t_8=t_7+\Delta T_4$.
9. The 5G_Msg3 contains an updated 5G_SE parameter, which is given by $5G\_SE+=(t_8-t_3)\times R_{i-1}$. This is to account for the frequency offset between the UE clock and the clock of the system i−1. This is captured by the rateRatio parameter from system i−1, i.e., $R_{i-1}$. The 5G_Msg3 also contains a rate correction factor (5G_RFC1) parameter which is given by by $(t_8-t_4)$. The 5G_Msg3 also updates 5G_Ref to 5G_Ref".
10. The gNB receives 5G_Msg3 at time $t_9$ which is given by $t_9=5G\_Ref"+TA/2+5G\_SE$. The UE computes the equivalent time in TSN time base, denoted by $tr_1$, when the 5G RAN time was $t_7$. This is given by $tr_1=t_9+\Delta T_5$, where $\Delta T_5$ denotes the difference between the 5G time base and the TSN time base at the gNB.
11. The gNB will eventually send a Sync_Msg at its egress port at time $ts_2$ to synchronize system i+1. It will have to compute a correctionField ($C_i$) parameter and a rateRatio parameter ($R_i$). The $C_i$ parameter is given by $C_i=(ts_2-tr_1)$. The $R_i$ parameter is given by $(t_9-t_5)/RCF1$ where RCF1 is given by $(t_8-t_4)$.

12. System i+1 synchronizes with the TSN grandmaster at time tr2 which is given by tr2=O+Pdi,i+1+Ci×Ri.

Transmission of 5G_Msg1, 5G_Msg2 and 5G_Msg3: In some embodiments, 5G_Msg1, 5G_Msg2 and 5G_Msg3 are MAC/PHY layer messages. The 5G_Msg1 is a scheduling request message which is sent on the physical uplink control channel (PUCCH). The scheduling request message additionally contains a resource allocation request message for 5G_Msg3. In response to the 5G_Msg1, the gNB transmits a 5G_Msg2 which is a scheduling response message that is sent on the physical downlink control channel (PDCCH). 5G_Msg2 contains a resource grant for transmission of 5G_Msg3. The 5G_Msg3 is transmitted on the physical downlink shared channel (PDSCH).

In other embodiments, 5G_Msg1, 5G_Msg2 and 5G_Msg3 are RRC layer messages such that these messages correspond to RRC connection request, RRC connection set up and RRC connection complete messages, respectively.

Equivalent Grandmaster Time Propagation: In some embodiments of the disclosed invention, equivalent grandmaster time is transmitted in Scenario A and Scenario B instead of the preciseOriginTimestamp (O). This is achieved through per port computation of equivalent grandmaster time which is propagated to the next port with necessary correction factors.

Embodiment 2: Transparent Clock Approach with 5G RAN Timestamping

Figure 20:
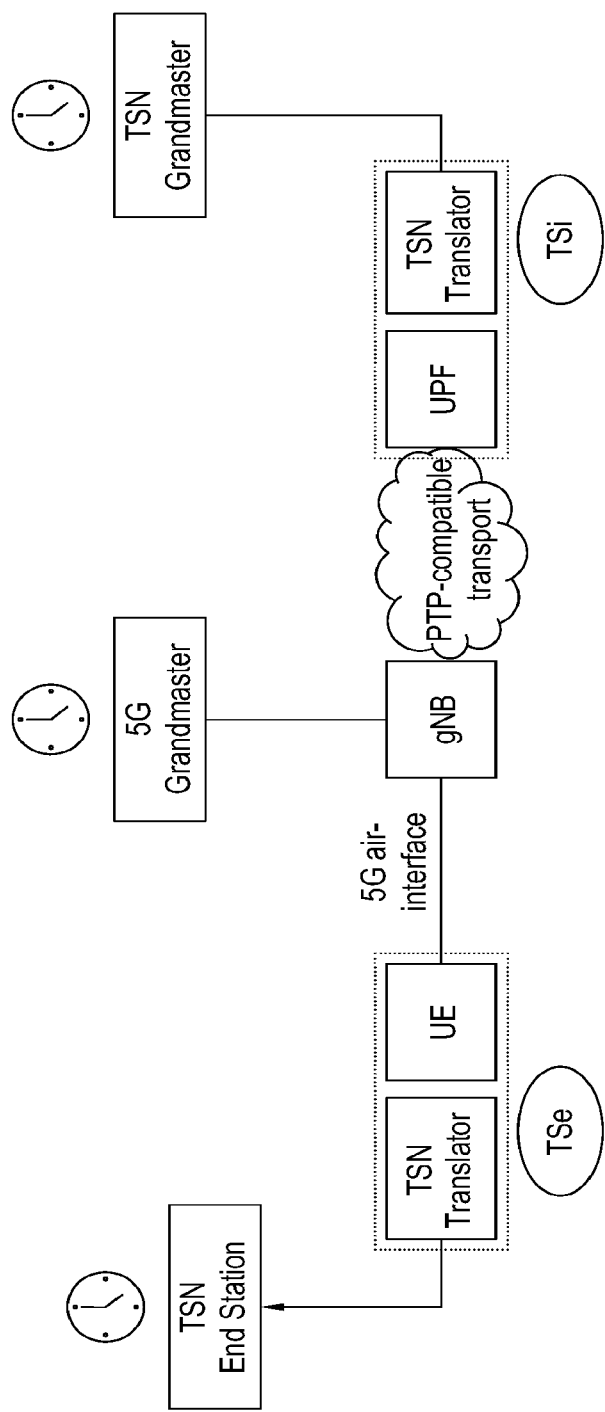
FIG. 20 illustrates a swimlane diagram of a time synchronization process of an embodiment.

An alternate approach for time synchronization is transparent clock approach (illustrated in FIG. 20) in which TSN translators are used at the edges of the 5G network, i.e., at the UE side and at the UPF side. These TSN translators take care of the IEEE 802.1AS operations such as time stamping and BMCA. This option requires either a fixed residence time in the 5G system or signaling of ingress and egress timestamps for measurement of residence time in the 5G system. The timestamping information (gPTP messages) from the UPF to the UE can be carried over the user-plane, e.g., through a protocol data unit (PDU) session. The ingress and egress timestamping of gPTP messages is based on the 5G system clock. A fixed residence time in the 5G systems requires a new quality-of-service (QoS) class and its associated procedures to provide deterministic latency. Signaling of ingress/egress timestamps requires a priori information of maximum transport delay between ingress and egress entities. In addition to this, the transparent clock approach may not be feasible for local 5G deployment wherein the gNB may have direct access to TSN grandmaster clock.

This approach provides a transparent clock functionality with 5G RAN timestamping. This is realized through exchange of PTP-like messages carrying timestamps over the air-interface. The time synchronization functionality in the gNB is realized at the PDCP layer and achieved through PDCP control or data protocol data units (PDUs). Time synchronization is achieved through timestamping packets at two different layers: once at the PDCP layer and then at the MAC layer.

Figure 21:
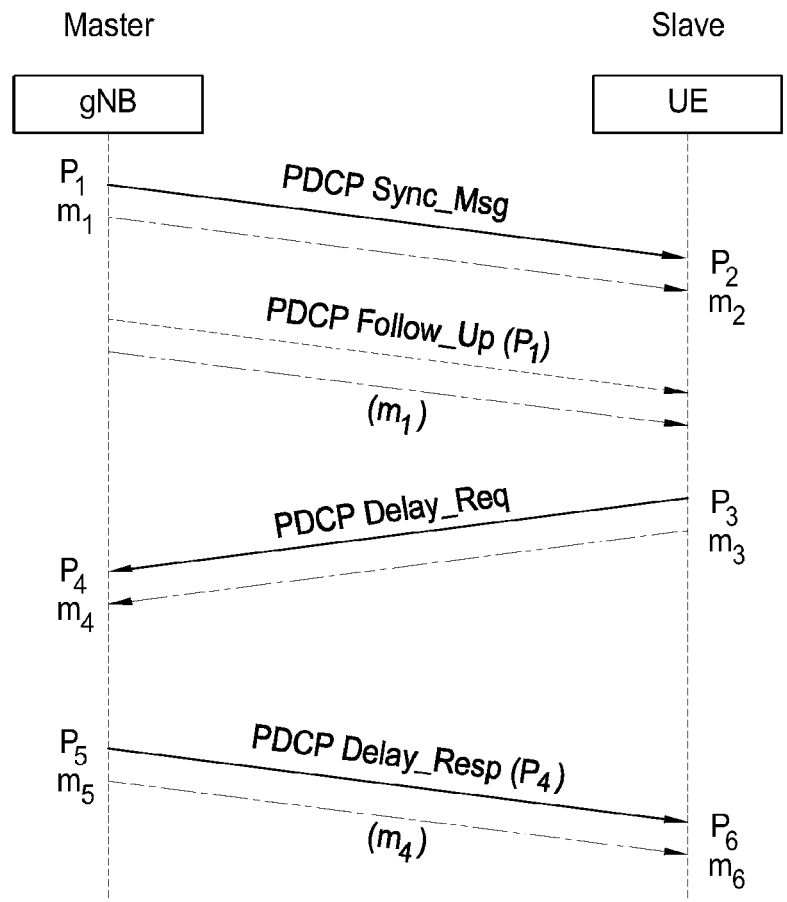
FIG. 21 illustrates a swimlane diagram of a time synchronization process of an embodiment.

This is illustrated in FIG. 21 wherein the gNB acts as the master for time synchronizing the UE (slave). The timestamps $P_1$, $P_2$, $P_3$ and $P_4$ are at the PDCP layer whereas the timestamps $m_1$, $m_2$, $m_3$ and $m_4$ are at the MAC layer. The gNB initiates the time synchronization procedure by transmitting a PDCP Sync_Msg at time $P_1$. At the MAC layer this message gets a timestamp $m_1$. This message is received by the UE at times $m_2$ and $P_2$ at the MAC layer and the PDCP layer, respectively. The gNB then transmits $P_1$ in a PDCP Follow_Up message.

It should be noted that $m_1$ is also sent in the PDCP Follow_Up message. The UE transmits a PDCP Delay_Req message and timestamps the instants $P_3$ and $m_3$ at the PDCP and the MAC layers, respectively. The gNB timestamps the arrival of PDCP Delay_Req message at the MAC and the PDCP layers, i.e., $m_4$ and $P_4$, respectively. It then transmits a PDCP Delay_Resp message carrying timestamps $m_4$ and $P_4$. The clock offset computation procedure is as follows.

At the MAC layer, the following equations apply.

$$m_2-m_1=\text{offset1}+\text{gNB-to-UE delay} \quad (1)$$

$$m_4-m_3=\text{UE-to-gNB delay}-\text{offset1} \quad (2)$$

Subtracting (2) from (1):

$$\text{gNB-to-UE delay}-\text{UE-to-gNB delay}=m_2-m_1-m_4+m_3-2\times\text{offset1}$$

Since gNB and UE are time synchronized based on the 5G clock, there is no offset, i.e., offset1=0. Hence, $$\text{gNB-to-UE delay}-\text{UE-to-gNB delay}=m_2-m_1-m_4+m_3 \quad (3)$$

At the PDCP layer, the following equations apply.

$$P_2-P_1=\text{offset2}+\text{gNB-to-UE delay} \quad (4)$$

$$P_4-P_3=\text{UE-to-gNB delay}-\text{offset2} \quad (5)$$

Subtracting (5) from (4):

$$2\times\text{offset2}=P_2-P_1-P_4+P_3-(\text{gNB-to-UE delay}-\text{UE-to-gNB delay}) \quad (6)$$

Hence, $$\text{offset2}=[P_2-P_1-P_4+P_3-(\text{gNB-to-UE delay}-\text{UE-to-gNB delay})]/2 \quad (7)$$

It will be noted that the delays in (7) can be computed using MAC layer timestamps in (3), i.e., $$\text{offset2}=[P_2-P_1-P_4+P_3-(m_2-m_1-m_4+m_3)]/2 \quad (8)$$

In some embodiments, the offset computation between the gNB and the UE accounts for the delay asymmetry and the PDCP timestamps. To account for delay asymmetry, a delay asymmetry factor (AF) is defined, which is computed as AF=gNB-to-UE delay/UE-to-gNB delay where the individual delays represent the delays at the PDCP layer:

$$\text{Offset2}=[P_2-P_1+AF\times(P_3-P_4)]/(2\times AF)$$

In some embodiments, the MAC layer provides resource allocation for explicitly carrying timestamps on PHY layer channels. This would be needed if hardware timestamping functionality is supported at the gNB and the UE.

Figure 25:
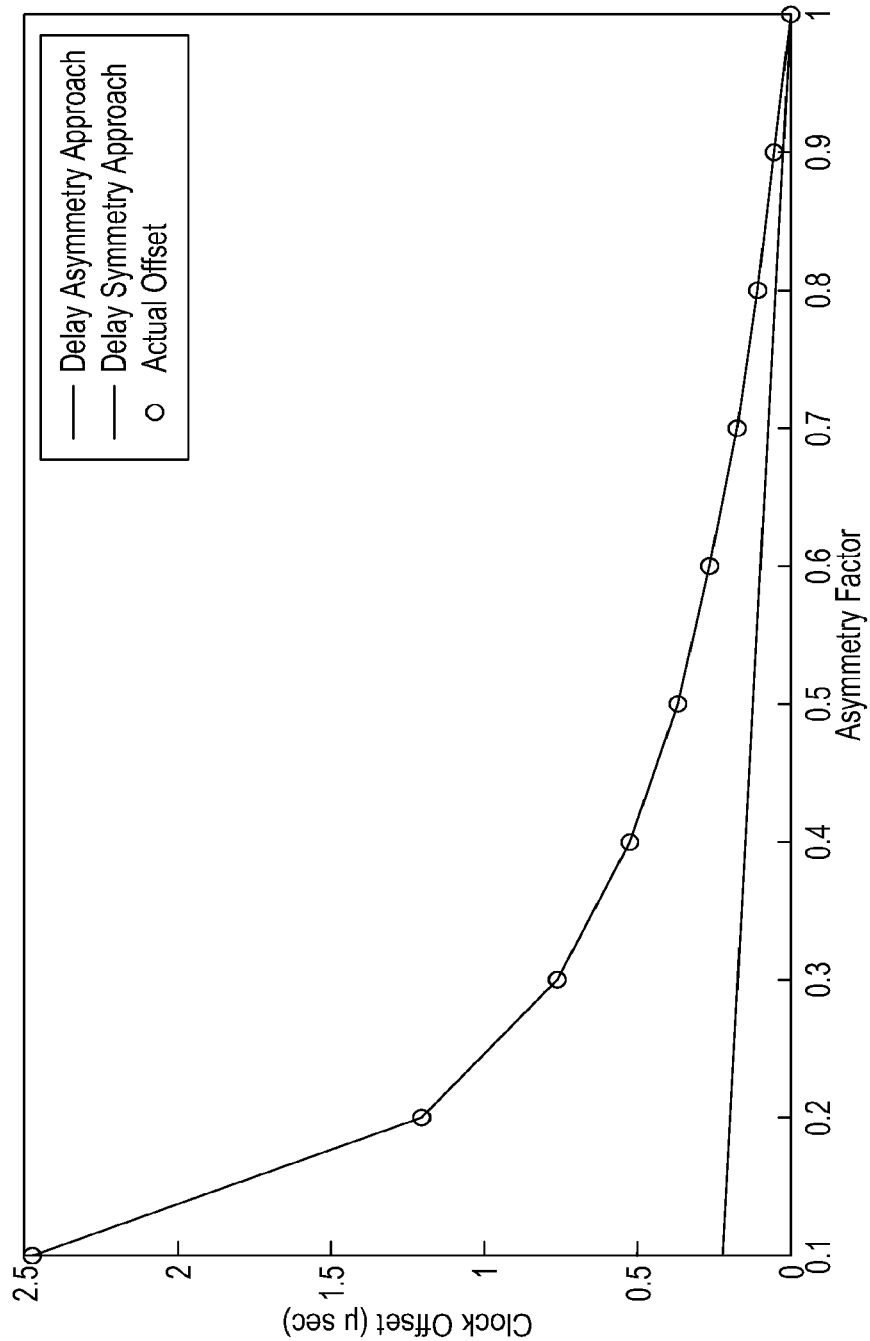
FIG. 25 illustrates a graph showing performance of embodiments in evaluations.

A simple performance evaluation can be conducted for delay offset computation under the impact of delay asymmetry. Results of such an evaluation are illustrated in FIG. 25. As shown by the results, the offset error computation under the assumption of delay symmetry does not capture the actual clock offset between master and slave clocks.

Figure 22:
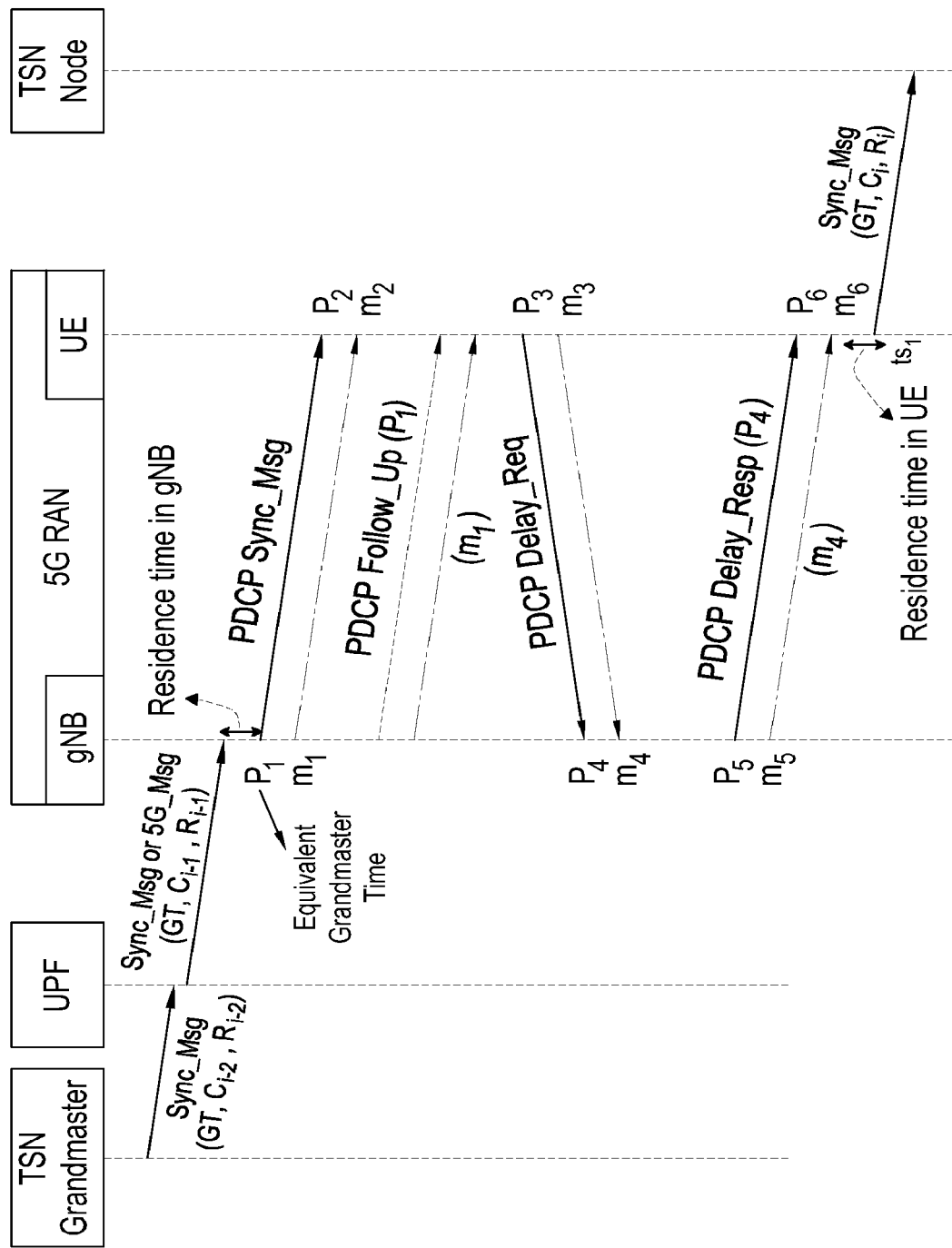
FIG. 22 illustrates a swimlane diagram of a time synchronization process of an embodiment.

Next, an explanation follows as to how a transparent clock functionality is achieved for time synchronization between a TSN grandmaster and a TSN node such as a TSN bridge or a TSN end station. This is illustrated in FIG. 22. The UPF is time synchronized to the TSN grandmaster based on IEEE 802.1AS. The UPF provides grandmaster time synchronization information to the gNB based on any control-plane or user-plane message of the interface connecting UPF and the gNB. The UPF may also be connected to the gNB over a PTP-compatible transport network. Hence, the gNB has access to the grandmaster time. The gNB computes the equivalent grandmaster time at the PDCP layer which is given by $P_1$. Calculation of equivalent grandmaster time is described in Embodiment 4 as discussed below.

$P_1$ accounts for the residence time within the gNB based on the time difference between receipt of the time synchronization information from the gNB and the transmission of the PDCP Sync_Msg. The UE time synchronizes to the gNB based on the 5G RAN timestamping procedure described above. The UE time synchronizes to the time $P_1$ at the PDCP layer. It synchronizes the TSN node by sending a Sync_Msg at time $ts_1$ which accounts for any residence time spent in the UE. The UE also computes a rate ratio parameter $R_i$ as $(P_6-P_2)/(P_5-P_1)$.

Embodiment 3: Single Time Domain Approach with 5G Grandmaster Clock

Figure 23:
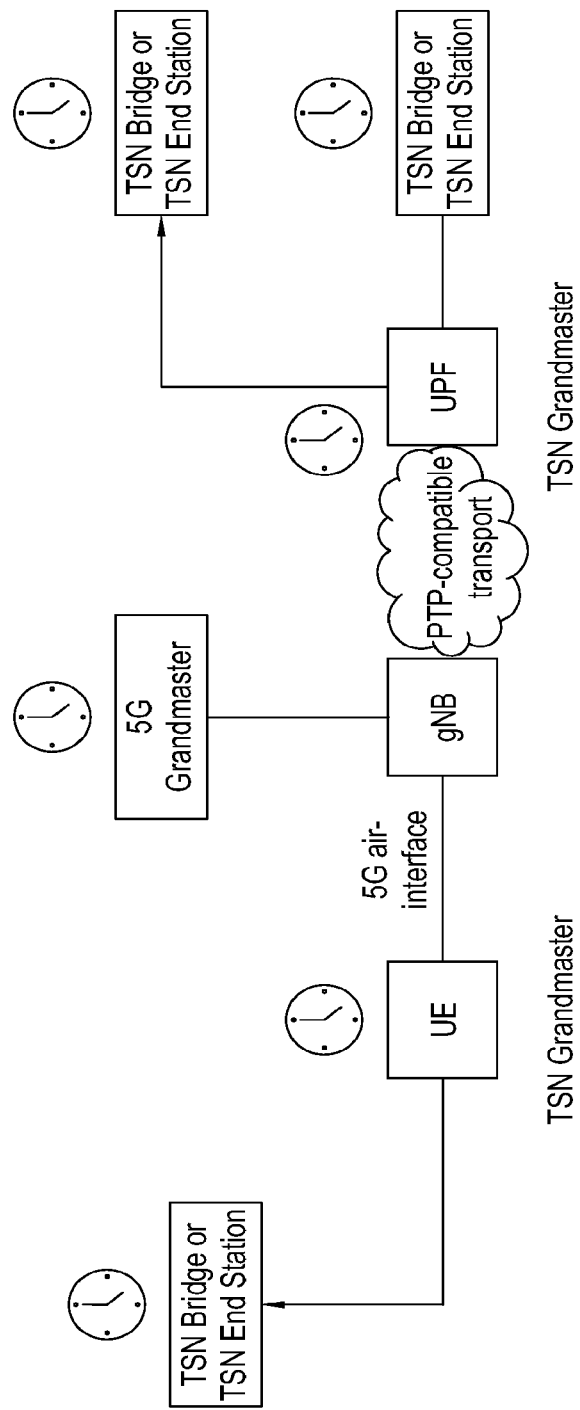
FIG. 23 illustrates a configuration scenario for implementation of embodiments.

This approach merges time domains (corresponding to multiple TSN working domains) into a single time domain using the 5G clock (at the gNB) as the grandmaster. This is illustrated in FIG. 23. The UE and the UPF are time synchronized to the 5G clock and act as TSN grandmasters to time synchronize the TSN end stations. In this case, the UE is time synchronized to the gNB using Embodiment 1 (Scenario A). The UPF is time synchronized to the gNB via the underlying PTP-compatible transport network.

Embodiment 4—Synchronization with 5G System Clock Reference

Figure 24:
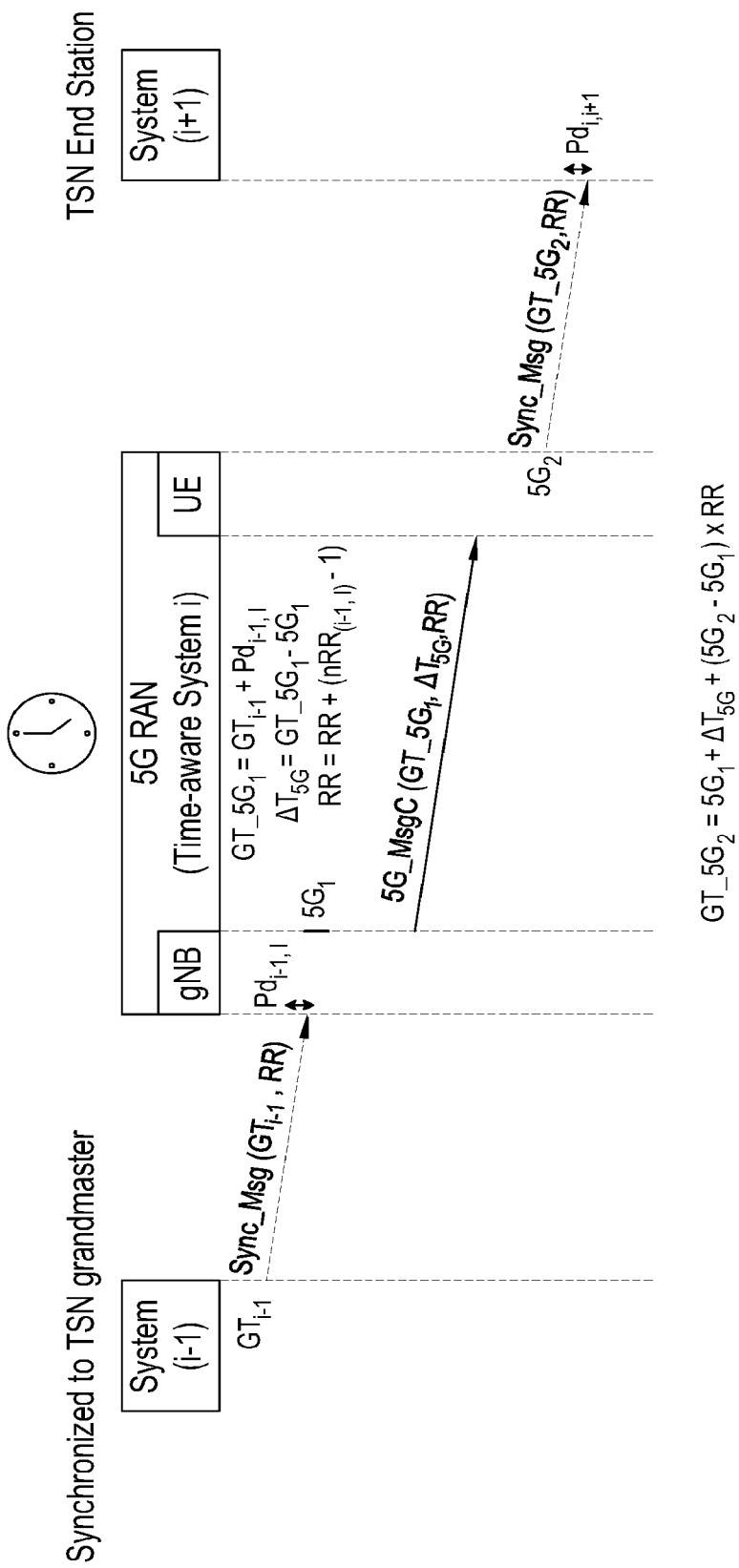
FIG. 24 illustrates a swimlane diagram of a time synchronization process of an embodiment.

This embodiment represents a scenario where synchronization message propagation takes place with 5G system clock as a reference and not a grandmaster (Embodiment 3). The gNB and the UE are assumed to be time synchronized based on the 5G system clock. This embodiment is illustrated in FIG. 24. Key steps for achieving time synchronization in this scenario are described as follows.
1. The gNB receives a Sync_Msg from system i−1 at time 5G1 which is time stamped relative to the 5G system clock.
2. The gNB calculates the grandmaster time at time 5G1 as GT_5G1=GTi−1+Pdi−1,i.
3. The gNB calculates the difference between the grandmaster time and the 5G system time which is given by ΔT5G=GT_5G1−5G1.
4. The gNB also computes the new accumulated rate ratio (RR) based on the neighbor rate ration between system i−1 and i. The updated RR is given by RR=RR+(nRR(i−1,i)−1).
5. The gNB sends a 5G message, denoted by 5G_MsgC, to indicate 5G1, ΔT5G and RR parameters to the UE. The 5G_MsgC can be a system broadcast message or a unicast message.
6. The UE sends a Sync_Msg to system i+1 at time 5G2 which contains the grandmaster time at 5G2 which is computed based on the residence time in the 5G system. The grandmaster time at 5G2 is given by GT_5G2=5G1+ΔT5G+(5G2−5G1)×RR.
7. System i+1 time synchronizes to the TSN grandmaster time based on the Sync_Msg and the updated RR.

The reader will note that it is also possible to account for different 5G system errors as described for Embodiment 1.

Embodiments as described herein are capable of providing accurate time synchronization for converged/integrated operation of TSN and a 5G system. Some of the key advantages that can be provided by certain embodiments are stated as follows.

Certain embodiments provide flexibility of time synchronization in integrated 5G and TSN deployments due to a wide range of operational scenarios and supported clock models.

Certain embodiments provide simplified time synchronization for converged 5G/TSN operation in private/local network deployments.

Certain embodiments provide the capability of correcting multiple errors on the air-interface clock frequency offsets that leads to accurate time synchronization.

The present disclosure is not limited to a 5G system. Certain embodiments can be directly extended to time synchronization between TSN and any other wireless system.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

The invention claimed is:
1. A composite network comprising:
   a guided communication network including a first guided communication network entity and a second guided communication network entity, the guided communication network being implemented by a wired network; and
   a wireless network including a first wireless network entity and a second wireless network entity,
   wherein one of the first guided communication network entity, the second guided communication network entity, the first wireless network entity and the second wireless network entity hosts a grandmaster clock operable to generate a grandmaster clock signal, wherein the one hosting the grandmaster clock is a boundary network entity establishing a measure of propagation delay between the first wireless network entity and the second wireless network entity, in communication with other networks, wherein the boundary network entity is operable to transmit, to the other networks, a timing synchronization message to enable network entities of the other networks to establish timing synchronization with the grandmaster clock signal, the timing synchronization being provided between the guided communication network entities and the wireless network entities, and
   wherein a timing advance parameter known to the first wireless network entity and the second wireless network entity is used to adjust an uplink transmission time of one of the first wireless network entity and the second wireless network entity, the timing advance parameter being based on the propagation delay between the first wireless network entity and the second wireless network entity.
2. The composite network in accordance with claim 1, wherein the boundary network entity is operable to transmit a timing synchronization message to the other networks.

3. The composite network in accordance with claim 2, wherein the timing synchronization message includes time synchronization information pertaining to the grandmaster clock.

4. The composite network in accordance with claim 3, wherein the network entities of the other networks are operable to synchronize to a network master clock, and wherein the boundary network entity is operable to transmit a timestamp of the network master clock, the timestamp being associated with the timing synchronization message.

5. The composite network in accordance with claim 4, wherein the boundary network entity is operable to transmit clock offset information to enable network entities of a receiving network to synchronize with the grandmaster clock using the time synchronization information.

6. The composite network in accordance with claim 1, wherein the grandmaster clock is hosted by one of the first guided communication network entity and the second guided communication network entity.

7. The composite network in accordance with claim 6, wherein the boundary entity is operable to transmit a message including a timestamp of the grandmaster clock signal, a reference time in the wireless network, and a timing error parameter accounting for propagation delays in the wireless network.

8. The composite network in accordance with claim 1, wherein the grandmaster clock is hosted by one of the first wireless network entity and the second wireless network entity, at least one of the first wireless network entity or the second wireless network entity is operable to initiate communications in the wireless network to establish the measure of propagation delay in the wireless network, and clock offset information is derived from the wireless network.

9. The composite network in accordance with claim 8, wherein the first wireless network entity and the second wireless network entity are configured to determine propagation delays by exchanging timestamps of local clocks with other network entities.

10. The composite network in accordance with claim 9, wherein one of the first wireless network entity and the second wireless network entity embodies a multi-layer protocol stack, and the first wireless network entity and the second wireless network entity exchange timestamps of two layers of the multi-layer protocol stack.

11. A method comprising:
synchronizing a guided communication network with a wireless network, the guided communication network including a plurality of guided communication network entities, the wireless network including a plurality of wireless network entities, one of the guided communication network entities and the wireless network entities hosting a grandmaster clock operable to generate a grandmaster clock signal, the one hosting the grandmaster clock being a boundary network entity establishing a measure of propagation delay between the first wireless network entity and the second wireless network entity, in communication with other networks, the guided communication network being implemented by a wired network;
transmitting, by the boundary network entity, to the other networks, a timing synchronization message to enable network entities of the other networks to establish timing synchronization with the grandmaster clock signal, the timing synchronization being provided between the guided communication network entities and the wireless network entities; and
using a timing advance parameter known to the first wireless network entity and the second wireless network entity to adjust an uplink transmission time of one of the first wireless network entity and the second wireless network entity, the timing advance parameter being based on the propagation delay between the first wireless network entity and the second wireless network entity.

12. The method in accordance with claim 11, wherein the grandmaster clock is hosted by one of the guided communication network entities and initiating, by the boundary network entity, communications in the wireless network to establish the measure of propagation delay, the measure being for transmission of messages in the wireless network.

13. The method in accordance with claim 11, wherein the grandmaster clock is hosted by one of the wireless network entities, and the method further comprises initiating, by at least one wireless network entity, communications in the wireless network to establish the measure of propagation delay in the wireless network, and clock offset information is derived from the wireless network.

14. A network device comprising:
a processor configured to manage communication between a guided communication network and a wireless network, the guided communication network being implemented by a wired network,
a receiver configured to receive a network time signal from each network, and, on the basis of a designation of the network time signal of one of networks as a grandmaster clock signal, the grandmaster clock signal being generated by a grandmaster clock, the grandmaster clock being hosted by an entity establishing a measure of propagation delay between wireless network entities; and
a transmitter configured to transmit a timing synchronization message to another network, the timing synchronization message being capable of enabling network entities of the another network to establish timing synchronization with the grandmaster clock signal, the timing synchronization being provided between entities of the guided communication network and entities of the wireless network, a timing advance parameter known to the first wireless network entity and the second wireless network entity being used to adjust an uplink transmission time of one of the first wireless network entity and the second wireless network entity, the timing advance parameter being based on the propagation delay between the first wireless network entity and the second wireless network entity.

15. The network device in accordance with claim 14, wherein the processor is configured to issue, with the timing synchronization message, clock offset information to account for propagation delay in one or more of the networks.

16. The network device in accordance with claim 14, wherein the processor is configured to issue propagation delay messages to determine propagation delay in one or more of the networks.

17. A method of managing communication between a guided communication network and a wireless network, the guided communication network being implemented by a wired network, the method comprising:
receiving a network time signal from each network, and, on the basis of a designation of the network time signal of one of networks as a grandmaster clock signal, the grandmaster clock signal being generated by a grandmaster clock, the grandmaster clock being hosted by an entity establishing a measure of propagation delay between wireless network entities;

transmitting a timing synchronization message to another network, the timing synchronization message enabling network entities of the another network to establish timing synchronization with the grandmaster clock signal, the timing synchronization being provided between entities of the guided communication network and entities of the wireless network; and using a timing advance parameter known to the first wireless network entity and the second wireless network entity to adjust an uplink transmission time of one of the first wireless network entity and the second wireless network entity, the timing advance parameter being based on the propagation delay between the first wireless network entity and the second wireless network entity.

18. The method in accordance with claim 17, further comprising issuing, with the timing synchronization message, clock offset information to account for propagation delay in one or more of the networks.

19. The method in accordance with claim 18, further comprising issuing a propagation delay message to determine propagation delay in one or more of the networks.

* * * * *